(12) United States Patent
Wolfe

(10) Patent No.: US 12,691,736 B1
(45) Date of Patent: Jul. 28, 2026

(54) VEHICLE COVER WITH LIGHTING

(71) Applicant: Boost Auto Parts LLC, West Chicago, IL (US)

(72) Inventor: Adam Wolfe, West Chicago, IL (US)

(73) Assignee: Boost Auto Parts LLC, West Chicago, IL (US)

( * ) Notice: Subject to any disclaimer, the term of this patent is extended or adjusted under 35 U.S.C. 154(b) by 0 days.

(21) Appl. No.: 19/409,401

(22) Filed: Dec. 4, 2025

(51) Int. Cl.

| | |
|---|---|
| *B60J 7/04* | (2006.01) |
| *B60J 7/057* | (2006.01) |
| *B60Q 1/22* | (2006.01) |
| *B60Q 1/26* | (2006.01) |
| *B60Q 1/44* | (2006.01) |

(52) U.S. Cl.
CPC ............. *B60J 7/041* (2013.01); *B60J 7/0573* (2013.01); *B60Q 1/22* (2013.01); *B60Q 1/2661* (2013.01); *B60Q 1/44* (2013.01)

(58) Field of Classification Search
CPC ..... B60J 7/041; B60J 7/14; B60J 7/141; B60J 7/1607; B60Q 1/0094; B60Q 1/22; B60Q 1/26; B60Q 1/2661
USPC ........................... 296/100.03, 100.06, 100.09
See application file for complete search history.

(56) References Cited

U.S. PATENT DOCUMENTS

| | | |
|---|---|---|
| 5,795,051 A | 8/1998 | Galanski |
| 6,116,761 A | 9/2000 | Munsey |
| 10,246,006 B1 | 4/2019 | Stowell et al. |
| 10,286,763 B2 | 5/2019 | Capiak et al. |
| 10,406,896 B2 * | 9/2019 | Ford ......................... B60J 7/041 |
| 10,449,893 B1 | 10/2019 | Singer |
| 11,701,950 B2 * | 7/2023 | Salter ................. B62D 33/0207 |
| | | 296/100.03 |
| 11,701,954 B2 * | 7/2023 | Kneifl .................... B60J 7/1204 |
| | | 296/100.1 |
| 11,760,177 B2 * | 9/2023 | Rossi ....................... B60J 7/141 |
| | | 296/100.09 |
| 12,024,002 B2 * | 7/2024 | Chen ....................... B60L 8/003 |
| 12,194,823 B2 | 1/2025 | Dylewski et al. |
| 12,403,752 B2 * | 9/2025 | Hammoud ............... B60J 7/141 |
| 2014/0198510 A1 | 7/2014 | Law et al. |
| 2018/0072219 A1 | 3/2018 | Harris et al. |
| 2018/0134132 A1 | 5/2018 | Nania |

(Continued)

FOREIGN PATENT DOCUMENTS

| | | |
|---|---|---|
| EP | 3517331 A1 | 7/2019 |
| EP | 3517331 B1 | 2/2021 |

(Continued)

*Primary Examiner* — Jason S Daniels

(74) *Attorney, Agent, or Firm* — Banner & Witcoff, Ltd.

(57) ABSTRACT

A vehicle cover is configured with one or more lighting elements that may be powered via an electronic control system. The electronic control system may comprise at least one power cable configured to be fixedly attached to a frame of the vehicle and/or a non-moving portion of the vehicle cover, and to be electrically coupled to a power supply of the vehicle. The electronic control system may comprise at least one electrical connector and/or at least one electrical contact that may be coupled to the one or more lighting elements of the vehicle cover and that may be configured to be: electrically coupled to the power supply of the vehicle if the vehicle cover is in a closed position, and electrically decoupled from the power supply of the vehicle if the vehicle cover is in an open position.

20 Claims, 12 Drawing Sheets

(56)         References Cited

U.S. PATENT DOCUMENTS

| | | | |
|---|---|---|---|
| 2018/0186221 A1* | 7/2018 | Capiak | B60J 7/108 |
| 2020/0130485 A1 | 4/2020 | Ireland et al. | |
| 2021/0291633 A1 | 9/2021 | Gu et al. | |
| 2021/0354537 A1 | 11/2021 | Kneifl et al. | |
| 2023/0286361 A1 | 9/2023 | Mantovani | |
| 2023/0382311 A1 | 11/2023 | Kunkel | |
| 2025/0026416 A1* | 1/2025 | Loudon | B62D 33/04 |
| 2025/0170880 A1* | 5/2025 | Breidenbach | B60J 7/198 |

FOREIGN PATENT DOCUMENTS

| | | | |
|---|---|---|---|
| EP | 4306346 A1 | 1/2024 | |
| EP | 4309931 A1 | 1/2024 | |
| EP | 4309932 A1 | 1/2024 | |
| EP | 4309933 A1 | 1/2024 | |
| WO | 2014053863 A1 | 4/2014 | |
| WO | 2020148215 A1 | 7/2020 | |
| WO | 2024012953 A1 | 1/2024 | |
| WO | 2024017643 A1 | 1/2024 | |
| WO | 2024017648 A1 | 1/2024 | |
| WO | 2024017650 A1 | 1/2024 | |

* cited by examiner

VEHICLE COVER WITH LIGHTING

TECHNICAL FIELD

Aspects described herein generally relate to vehicle covers, and more specifically, to various types of truck bed covers such as tonneau covers.

BACKGROUND

A vehicle cover is used for protection, such as to protect contents from weather or theft. Truck bed covers, such as tonneau covers, are used to protect contents of a truck bed. Tonneau covers are made in different configurations such as mechanical roll-up, electric roll-up, soft roll-up, and tri-fold, but they are limited in their functionality of covering a truck bed.

SUMMARY

The following presents a summary in order to provide a general understanding of various aspects of the disclosure. The summary is not an exhaustive overview of the disclosure and is not intended to limit the scope of any inventive concepts described herein.

Aspects of this disclosure relate to improved vehicle covers generally, and truck bed covers in particular. As described herein, a vehicle cover is configured with one or more lighting elements. The one or more elements may be configured to be controlled by one or more mechanisms, such as by one or more vehicle operations and/or user-selectable controls. As a non-limiting example, a vehicle cover may be configured with one or more lighting elements at a rear portion of a vehicle, and the one or more lighting elements may be configured to operate as additional vehicle lighting corresponding to lighting for one or more vehicle operations such as one or more of a brake light, a turn light signal, a reverse signal, a running light, an animation, and/or any other indication. As a non-limiting example, the one or more lighting elements may be controlled by a user-selectable device such as a key fob, a phone app, a wireless device, and/or a controller installed on or within the vehicle. The one or more lighting elements may be powered via an electronic control system. The electronic control system may comprise at least one power cable and/or wire configured to be fixedly attached to a frame of the vehicle and/or to a non-moving portion of the vehicle cover (such as at least one mounting structure), and to be electrically coupled to a power supply of the vehicle. In at least some examples, the electronic control system may comprise one or more data and/or control cables for controlling operation of the vehicle cover and/or for controlling operation of the one or more lighting elements. The electronic control system may comprise at least one electrical connector and/or at least one electrical contact that may be coupled to the one or more lighting elements of the vehicle cover and that may be configured to be: electrically coupled to the power supply of the vehicle if the vehicle cover is in a closed position, and electrically decoupled from the power supply of the vehicle if the vehicle cover is in an open position. In at least some examples, the electronic control system may comprise one or more electrical contacts that may be located at one or more different positions so as to enable operation of the one or more lighting elements at the different position(s), such as if the vehicle cover is in an open position and/or if the vehicle cover is in a partially open position and/or in a partially closed position. By using the electronic control system described herein, power and/or control may be provided to the one or more lighting elements of the vehicle cover in a reliable manner without risk of damage to power and/or control cables by repeated movement of the vehicle cover, such as by opening and/or closing the cover, thereby providing advantages such as high-reliability, high durability of operation, and/or other advantages that may be evident from the disclosure herein.

These features, along with many others, are described in greater detail below.

BRIEF DESCRIPTION OF THE DRAWINGS

The present disclosure is shown by way of example figures, listed below, in which like reference numerals indicate similar elements.

DETAILED DESCRIPTION

In the following detailed description, reference is made to the accompanying drawings, which form a part hereof, and in which is shown, by way of example, various embodiments in which aspects of the disclosure may be implemented. It is to be understood that other embodiments may be used, and structural and functional modifications may be made, without departing from the scope of the present disclosure.

A vehicle cover may be used to protect contents of a vehicle, such as from weather and/or theft. Truck bed covers may be used to protect contents of a truck bed. Various types of truck bed covers may include configurations such as mechanical roll-up, an electric roll-up, a soft roll-up, and a tri-fold. Additionally, vehicles and/or vehicle accessories may include a variety of lighting elements, and at least some truck covers may comprise one or more lighting elements. For example, a vehicle and/or a truck bed cover may be configured with one or more lights to illuminate a truck bed and/or to illuminate an area around a truck bed. However, controlling illumination of such lighting presents a variety of challenges. For example, a cover may block lighting in a truck bed when the cover is closed. A cover with external lighting may be forced to remain stationary when a cover moves between positions of open and closed, for example, to avoid exposing wiring for power and/or control signaling. For moveable covers that are configured with a lighting element that moves along with the cover, wiring may be damaged over time from repeated movement of the cover. Additionally or alternatively, for such moveable covers, complicated wiring support structures that may be used in an attempt to reduce a risk of damage to wiring may in turn increase the cost for manufacture and/or installation, while still not providing a full-proof method for avoiding damage to wiring. As described further herein, however, an improved vehicle cover with lighting is provided that overcomes these and/or other challenges and that provides for illumination on a truck bed cover, such as at the rear of a vehicle when the cover is closed, without risking potential damage to wiring when the cover moves between positions of open and closed.

Figure 1:
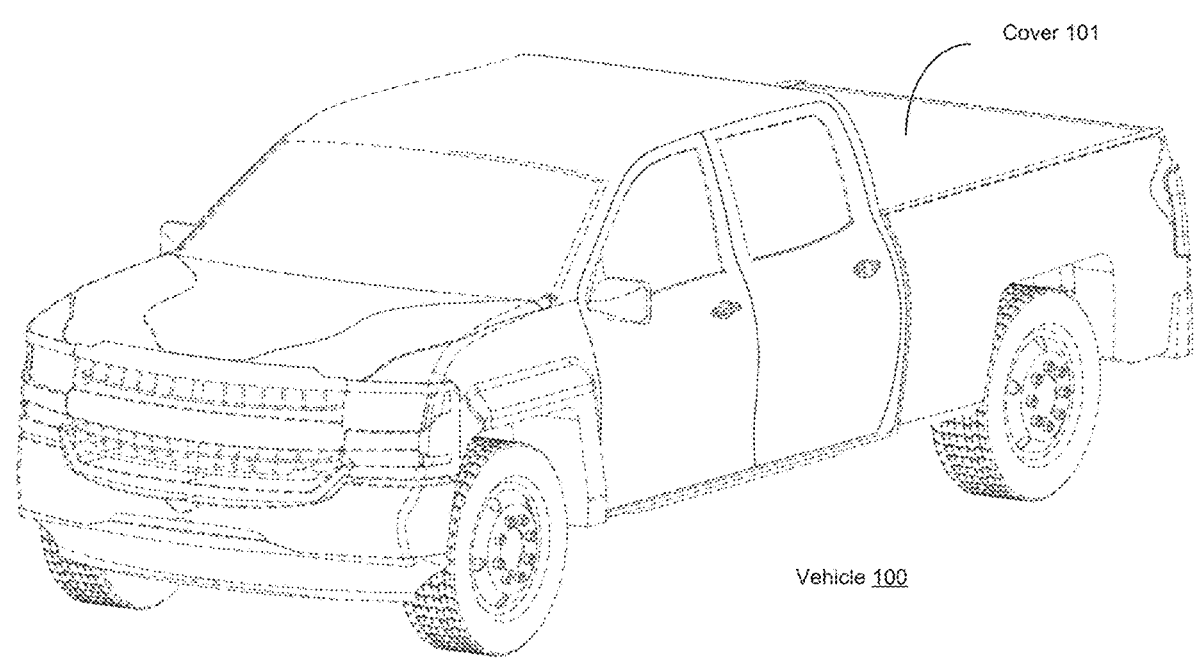
FIG. 1 shows an example of a vehicle comprising a vehicle cover.

FIG. 1 shows an example of a vehicle comprising a vehicle cover. While a vehicle 100 is shown as a truck, concepts described herein may be applied to any type of vehicle or vehicle accessory, such as a truck, a sport utility vehicle (SUV), a sedan (e.g., for a cover on a convertible), and/or a trailer for any vehicle. The vehicle 100 is configured with a cover 101. The cover 101 may be factory-installed or may be an aftermarket product for installation on the vehicle 100. As used herein, the term "cover" may include (but is not limited to) a tonneau cover, and reference to a "tonneau" cover herein may refer to any type of cover used for a vehicle. Non-limiting examples of covers, such as tonneau covers, include mechanical roll-up covers, electric roll-up covers, soft roll-up covers, and tri-fold covers. Concepts described herein are not limited to any specific type of cover unless otherwise stated.

Figure 2:
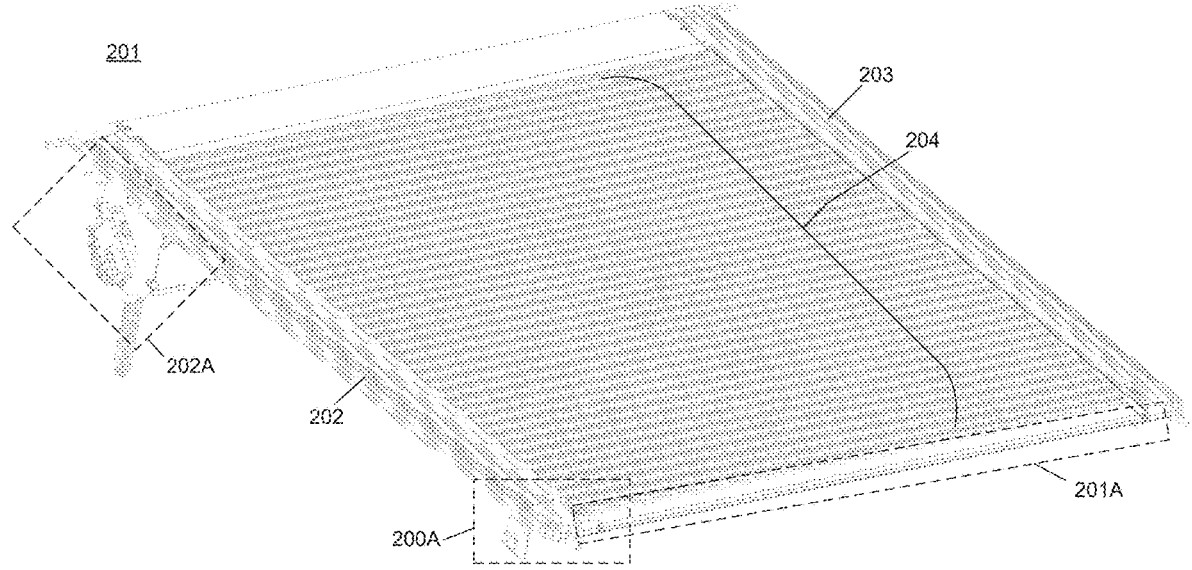
FIG. 2 shows an example of a vehicle cover with lighting.

FIG. 2 shows an example of a vehicle cover with lighting. A vehicle cover 201 may comprise the cover 101 shown and described with respect to FIG. 1. The cover 201 may comprise, as a non-limiting example, an electric roll up cover. The cover 201 may comprise a frame that may be configured to be mounted to a truck bed. The frame may comprise a first rail 202 and a second rail 203. The first rail 202 may be configured to be located along the truck bed on a driver side of a truck. The second rail 203 may be configured to be located along the truck bed on a passenger side of the truck. The cover 201 may comprise a plurality of slats 204. The plurality of slats 204 may be configured to be rolled into a storage area, shown in area 202A, via operation of a motor 304 that shown and described further with respect to FIG. 3. For example, the motor 304 may be configured to rotate in a first direction to roll up the plurality of slats 204 into the storage area so as to uncover a truck bed in an open position of the cover 201, and the motor may be configured to rotate in a second direction (opposite from the first direction) to unroll the plurality of slats 204 so as to cover a truck bed in a closed position of the cover 201. Each slat of the plurality of slats 204 may comprise a first end and a second end (e.g., at a respective driver side and a passenger side of a vehicle). To facilitate movement of the plurality of slats relative to the frame, the first end of each slat may be configured to moveably rest on the first rail 202 and the second end of each slat may be configured to moveably rest on the second rail 203. In at least some examples, the cover 201 may be configured without a frame such that the first end of each slat may be configured to moveably rest on a first side of the truck bed (e.g., driver side), and the second end of each slat may be configured to moveably rest on a second side of the truck bed (e.g., passenger side).

The cover 201 may comprise an electronic control system that may be configured to move the plurality of slats 204 and/or that may be configured to illuminate one or more lighting elements. As a non-limiting example, the one or more lighting elements may be located at a rear portion of a vehicle and the one or more lighting elements may be configured to operate as additional vehicle lighting corresponding to lighting for one or more vehicle operations, such as one or more of a brake light, a turn light signal, a reverse signal, a running light, an animation, and/or any other indication. The electronic control system may comprise at least one motor, such as the motor 304 shown and described with respect to FIG. 3, that may be configured to receive electric power to control movement of the plurality of slats 204 along the first rail 202 (and/or along the first side of the truck bed) and along the second rail 203 (and/or along the second side of the truck bed). The motor 304 may be configured to receive the electric power from a power supply (e.g., a vehicle battery) of a vehicle on which the cover 201 may be installed. The electronic control system may comprise at least one power cable and/or wire configured to be fixedly attached to the frame (and/or to one or more of the first rail 202 and/or the second rail 203) and electrically coupled to the electric power (e.g., from a vehicle battery). The electronic control system may comprise at least one electrical connector and/or at least one electrical contact that is electrically coupled to the one or more lighting elements, as described further herein. The at least one electrical connector and/or the at least one electrical contact may be configured to be: electrically coupled to the electric power via the at least one power cable if the truck bed cover is in a closed position; and electrically decoupled from the electric power if the truck bed cover is in an open position. The electronic control system may comprise one or more of a controller and/or a wired or wireless transceiver that may be controlled by a user-selectable device such as a key fob, a phone app, a wireless device, and/or a controller installed on or within the vehicle.

The area 200A shows a corner of the cover 201 that may be located at the rear driver-side of a vehicle such as the vehicle 101. The area 201A shows the end of the cover 201 that may be located at a rear of a vehicle such as the vehicle 101. One or more cables and/or wires, such as at least one power cable/wire and/or at least one control signaling cable/wire, may be configured within or under the first rail 202 and/or within or under the second rail 203. The one or more cables/wires may be configured to power and/or control one or more lighting elements located on the end of the cover 201 in the area 201A. The area 200A may comprise a corner portion that may be used to cover a coupling of at least one electrical contact with the one or more cables/wires/conductors and/or with the one or more lighting elements in a manner that provides power and/or control to the one or more lighting elements without exposed or moveable wiring. As a result, power and/or control signaling may be provided to the one or more lighting elements on the cover 201 (e.g., in the area 201A) in a manner than may avoid potential damage to wiring when the cover 201 moves between positions of open and closed, as explained further herein.

Figure 3:
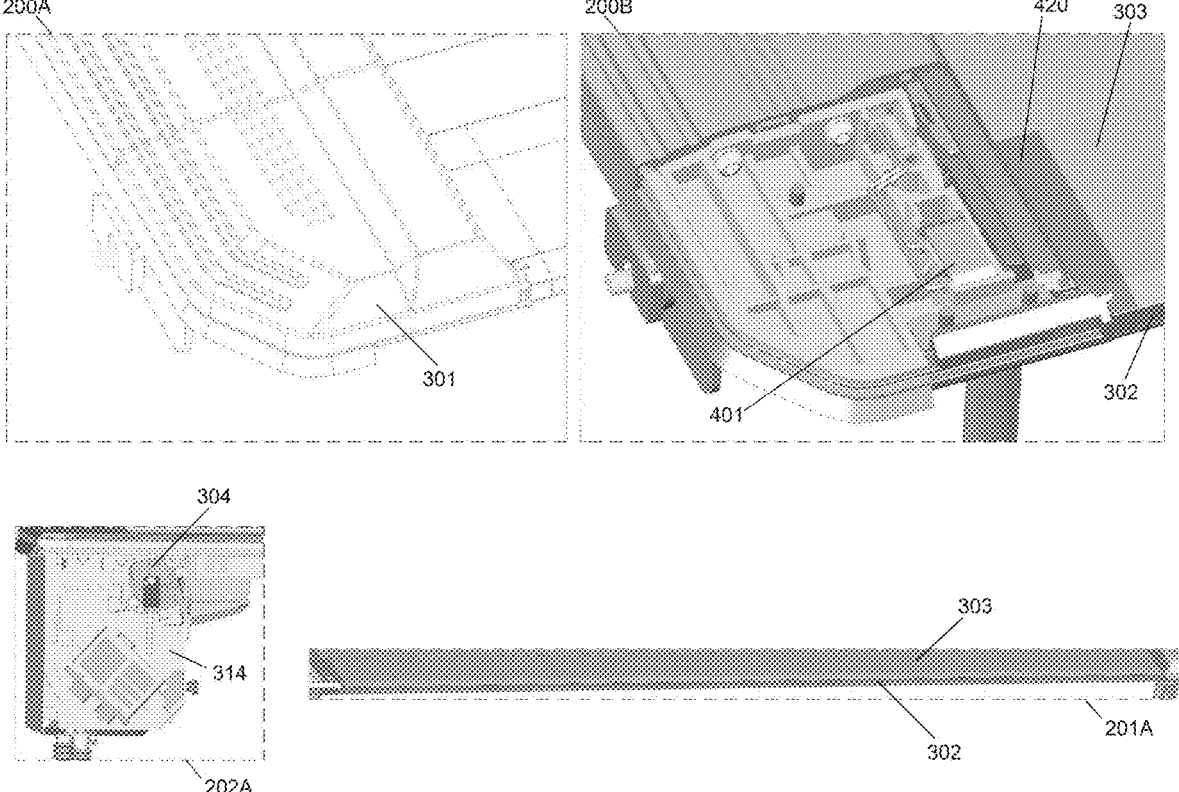
FIG. 3 shows additional views of the vehicle cover according to FIG. 2.

FIG. 3 shows additional views of the vehicle cover 201 according to FIG. 2. The area 200A in FIG. 3 corresponds to the portion of the cover 201 shown in the same labeled area 200A of FIG. 2. As shown in FIG. 3, a corner of the cover 201 may comprise a corner portion 301. In at least some examples, the corner portion 301 may comprise an end cap. In at least some other examples, the corner portion 301 shown in FIG. 3 may be in a different location of the cover 201, such as in any other location that may be near one or more lighting elements.

The area 200B in FIG. 3 corresponds to the same labeled area 200A but with a top of the corner portion 301 removed (e.g., an end cap removed). As shown in the exposed area of the corner portion 301, one or more electrical connectors may be included within an area, such as shown at component 401. The component 401 may comprise the electrical connector(s). In at least some examples, the component 401 may comprise a covering for the electrical connector(s). An end piece 303 of the cover 201 may comprise one or more lighting elements 302. In at least some examples, the end piece 303 may comprise one or more of the plurality of slats 204 that may comprise the lighting element(s) 302. Within the area 200B, at an edge 420 of the end piece 303, the one or more lighting elements 302 may be electrically connected to the one or more electrical connectors within the component 401, for example, if the cover 201 is in a closed position (e.g., fully extended).

The area 201A in FIG. 3 corresponds to the portion of the cover 201 shown in the same labeled area 201A of FIG. 2. As shown in FIG. 3, the end piece 303 of the cover 201 may comprise the one or more lighting elements 302 along a length of the end piece 303 that may be located at a rear of the vehicle, for example, if the cover 201 is in a closed position.

The area 202A in FIG. 3 corresponds to the portion of the cover 201 shown in the same labeled area 202A of FIG. 2. As shown in FIG. 3, the area 202A may comprise a motor 304 located within a storage area 314 in which the cover 201 may also be stored, for example, if the cover 201 is in an open position (e.g., fully retracted/stored). The motor 304 may be configured to rotate a shaft that may be configured to engage and/or control the cover 201 (e.g., via engagement of underside portions of the plurality of slats 204), for example, to move the cover 201 in directions perpendicular to the length of the plurality of slats 204 so as to close the cover 201 (e.g., via rotation of the shaft in a first direction) and/or open the cover 201 (e.g., via rotation of the shaft in a second direction, opposite from the first direction). While the motor 304 in FIG. 3 is shown on a passenger side of a vehicle, the motor 304 may be located at any other location (e.g., within the storage area 304). The motor 304 may be configured to rotate the shaft in a clockwise direction to close the cover 201, for example, if the motor 304 is located on a driver side of a vehicle (such as shown in FIG. 3). Additionally or alternatively, the motor 304 (or an additional motor) may be configured to rotate the shaft in a counterclockwise direction to close the cover 201, for example, if the motor is located on a passenger side of a vehicle.

Figure 4:
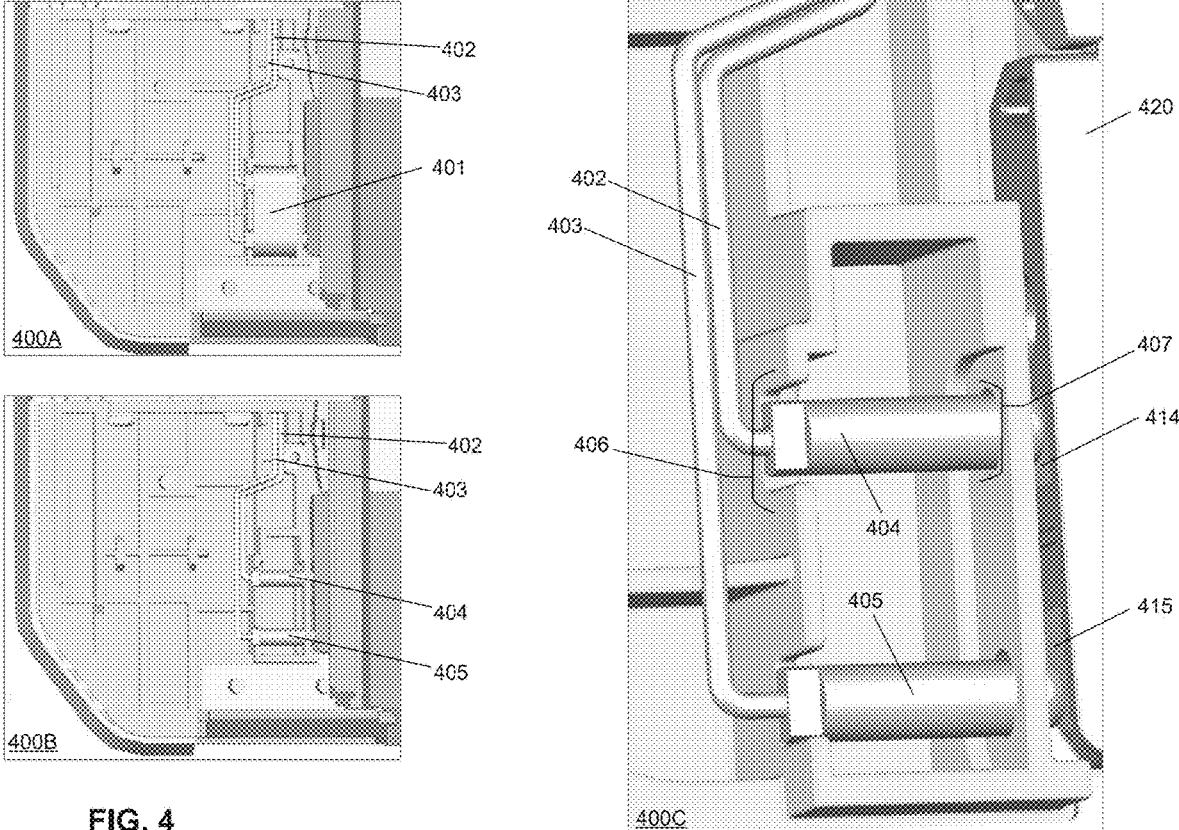
FIG. 4 shows additional views of the vehicle cover according to FIGS. 2 and 3.

FIG. 4 shows additional views of the vehicle cover according to FIGS. 2 and 3. Area 400A shows a top view of the exposed area of the corner portion 301 of the cover 201. Area 400B shows the same top view as the area 400A, but with the component 401 comprising a covering (shown in area 400A) that has been removed in area 400B to reveal electrical connectors 404 and 405. Area 400C shows a zoomed in view of the exposed area of the corner portion 301 of the cover 201, showing the edge 420 of the end piece 303 of the cover 201 in a position to electrically connect the one or more lighting elements 302 to the electrical connectors 404 and 405 via respective electrical contacts 414 and 415. In particular, the end piece 303 may comprise a first electrical contact 414 that may be configured to engage a first electrical connector 404 (e.g., if the cover 201 is in a particular position such as a closed position) that may be electrically coupled to a first conductor 402 (e.g., cable, wire, etc.). The end piece 303 may comprise a second electrical contact 415 that may be configured to engage a second electrical connector 405 (e.g., if the cover 201 is in a particular position such as a closed position) that may be electrically coupled to a second conductor 403 (e.g., cable, wire, etc.). While only two electrical contacts (414, 415), two corresponding electrical connectors (404, 405), and two corresponding conductors (402, 403) are shown in FIG. 4, the cover 201 may comprise any number of electrical contacts, electrical connectors, and/or conductors. For example, at least one electrical contact, electrical connector, and/or conductor may be configured to enable a positive voltage to be supplied to the one or more lighting elements 302, for example, if the cover 201 is in a position such that the electrical contact is electrically coupled to a respective electrical connector and/or conductor. In at least some examples, at least one electrical contact, electrical connector, and/or conductor may be configured as a data signaling connection that may be electrically connected to the one or more lighting elements 302, for example, if the cover 201 is in a position such that the electrical contact is electrically coupled to a respective electrical connector and/or conductor for controlling operation of the one or more lighting elements 302 (e.g., via the electronic control system described herein). In at least some examples, at least one electrical contact, electrical connector, and/or conductor may be configured as a ground connection that may be electrically connected to the one or more lighting elements 302, for example, if the cover 201 is in a position such that the electrical contact is electrically coupled to a respective electrical connector and/or conductor that may be connected to an electrical ground. In at least some examples, a plurality of electrical connectors may be used to electrically couple to the same electrical contact and/or to the same conductor. In at least some examples, an electrical connector and/or an electrical contact may be configured to receive data signaling over a voltage supply, such as by pulse width modulation (PWM).

The one or more electrical connectors (404, 405) may be configured to have a surface suitable for making an electrical connection with a respective electrical contact (414, 415). In at least some examples, an electrical contact (414, 415) may comprise a substantially flat metal surface and/or an electrical connector (404, 405) may comprise a rounded surface that may facilitate electrical connection with relatively low friction, which may help to reduce component wear and/or reduce risk of failure. In at least some examples, an electrical connector (404, 405) may be spring-loaded, which may help to maintain a reliable electrical connection with a respective electrical contact (414, 415). The cover 201 may be configured with one or more structures (406, 407) that may support and/or secure a relative positioning of one or more electrical connectors (404, 405). The one or more structures may comprise any shape, such as a cutout (e.g., 406), a hole (e.g., 407), and/or any other shape and/or additional component (e.g., bracket, screw, etc.). Illumination and/or control of the one or more lighting elements 302 may be initiated, for example, if the edge 420 of the end piece 303 of the cover 201 is located at (e.g., moved to) a position such that one or more electrical contacts (414, 415) are electrically coupled to a respective electrical connector (404, 405), such as if the cover 201 is in a closed position. Illumination and/or control of the one or more lighting elements 302 may be terminated if the edge 420 of the end piece 303 of the cover 201 is moved such that one or more electrical contacts (414, 415) are no longer electrically coupled to a respective electrical connector (404, 405), such as if the cover is moved from a closed position to a partially open position or a fully open position.

While the cover 201 described with respect to FIGS. 1-4 comprises one or more electrical connectors (404, 405), one or more electrical contacts (414, 415), and one or more conductors (402, 403) located at a corner portion 301 of the cover (e.g., a driver side rear corner), one or more electrical connectors and/or one or more electrical contacts may be located at any other portion of the cover 201. For example, one or more electrical connectors, electrical contacts, and/or conductors may be located at one or more other (or additional) corners of the cover 201, such as at a rear passenger side of the vehicle, vehicle cab end driver side of the vehicle, and/or vehicle cab end passenger side of the vehicle. Additionally or alternatively, one or more electrical connectors and/or electrical contacts may be located at one or more positions along one or more sides of the cover 201 (e.g., along driver side and/or passenger side of a truck bed). For example, one or more electrical connectors may be located at multiple locations along a side (or both sides) of the cover 201, such that the one or more lighting elements 302 may be illuminated and/or controlled at any position at which one or more respective electrical contacts of the cover 201 are electrically coupled to one or more electrical connectors. Additionally, one or more electrical contacts may be located at one or more positions along one side (or both sides) of the cover 201, such that the one or more lighting elements 302 may be illuminated and/or controlled at additional positions at which respective electrical contacts of the cover 201 are electrically coupled to electrical connectors. Additionally or alternatively, the cover 201 may be configured with one or more energy storage devices (e.g., battery/batteries, capacitor(s), etc.) that may be used to energize the one or more lighting elements 302, for example, if the one or more lighting elements 302 are at locations that may not have electrical connector(s) being electrically coupled to electrical contact(s), such as during movement of the cover 201. In such a configuration, the one or more lighting elements 302 may be configured to remain illuminated and/or controlled during movement of the cover 201 and/or at one or more position(s) of the cover 201 in between being closed and open.

Figure 5:
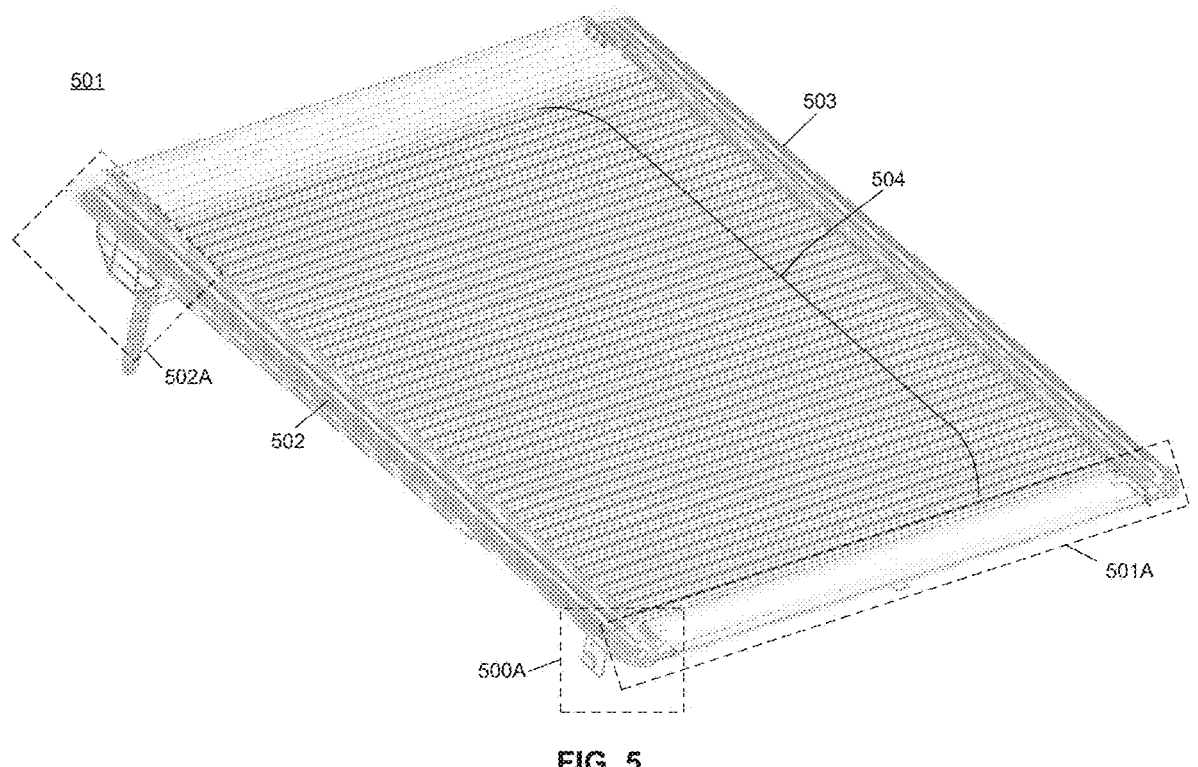
FIG. 5 shows an example of a vehicle cover with lighting.

FIG. 5 shows an example of a vehicle cover. A vehicle cover 501 may comprise the cover 101 shown and described with respect to FIG. 1. The cover 501 may comprise, as a non-limiting example, a manual roll up cover. The cover 501 may correspond to the cover 201 described with respect to FIGS. 2-4, for example, except that the cover 501 may lack a motor (such as the motor 304 of FIG. 3). Accordingly, FIGS. 2-4 and all descriptions thereof with respect to the cover 201 are hereby incorporated by reference with respect to the cover 501.

The cover 501 may comprise a frame that may be configured to be mounted to a truck bed. The frame may comprise a first rail 502 and a second rail 503. The first rail 502 may be configured to be located along the truck bed on a driver side of a truck. The second rail 503 may be configured to be located along the truck bed on a passenger side of the truck. The cover 501 may comprise a plurality of slats 504. The plurality of slats 504 may be configured to be rolled into a storage area, shown in area 502A, such as via a manual operation described further with respect to FIG. 6. For example, a spring-loaded reel may be configured to rotate in a first direction to roll up the plurality of slats 504 into the storage area so as to uncover a truck bed in an open position of the cover 501, and the spring-loaded reel may be configured to rotate in a second direction (opposite from the first direction) to unroll the plurality of slats 504 so as to cover a truck bed in a closed position of the cover 501. Each slat of the plurality of slats 504 may comprise a first end and a second end (e.g., at a respective driver side and a passenger side of a vehicle). To facilitate movement of the plurality of slats relative to the frame, the first end of each slat may be configured to moveably rest on the first rail 502 and the second end of each slat may be configured to moveably rest on the second rail 503. In at least some examples, the cover 501 may be configured without a frame such that the first end of each slat may be configured to moveably rest on a first side of the truck bed (e.g., driver side), and the second end of each slat may be configured to moveably rest on a second side of the truck bed (e.g., passenger side).

The cover 501 may comprise an electronic control system that may be configured to illuminate one or more lighting elements. As a non-limiting example, the one or more lighting elements may be located at a rear portion of a vehicle, and the one or more lighting elements may be configured to operate as additional vehicle lighting corresponding to lighting for one or more vehicle operations, such as one or more of a brake light, a turn light signal, a reverse signal, a running light, an animation, and/or any other indication. The electronic control system may comprise at least one power cable and/or wire configured to be fixedly attached to the frame (and/or to one or more of the first rail 502 and/or the second rail 503) and electrically coupled to the electric power (e.g., from a vehicle battery). The electronic control system may comprise at least one electrical connector and/or at least one electrical contact that is electrically coupled to the one or more lighting elements, as described further herein. The at least one electrical connector and/or the at least one electrical contact may be configured to be: electrically coupled to the electric power via the at least one power cable if the truck bed cover is in a closed position; and electrically decoupled from the electric power if the truck bed cover is in an open position. The electronic control system may comprise one or more of a controller and/or a wired or wireless transceiver that may be controlled by a user-selectable device such as a key fob, a phone app, a wireless device, and/or a controller installed on or within the vehicle.

The area 500A shows a corner of the cover 501 that may be located at the rear driver-side of a vehicle such as the vehicle 101. The area 501A shows the end of the cover 501 that may be located at a rear of a vehicle such as the vehicle 101. One or more cables and/or wires, such as at least one power cable/wire and/or at least one control signaling cable/wire, may be configured within or under the first rail 502 and/or within or under the second rail 503. The one or more cables/wires may be configured to power and/or control one or more lighting elements located on the end of the cover 501 in the area 501A. The area 500A may comprise a corner portion that may be used to cover a coupling of at least one electrical contact with the one or more cables/wires/conductors and/or with the one or more lighting elements in a manner that provides power and/or control to the one or more lighting elements without exposed or moveable wiring. As a result, power and/or control signaling may be provided to the one or more lighting elements on the cover 501 (e.g., in the area 501A) in a manner than may avoid potential damage to wiring when the cover 501 moves between positions of open and closed, as explained further herein.

Figure 6:
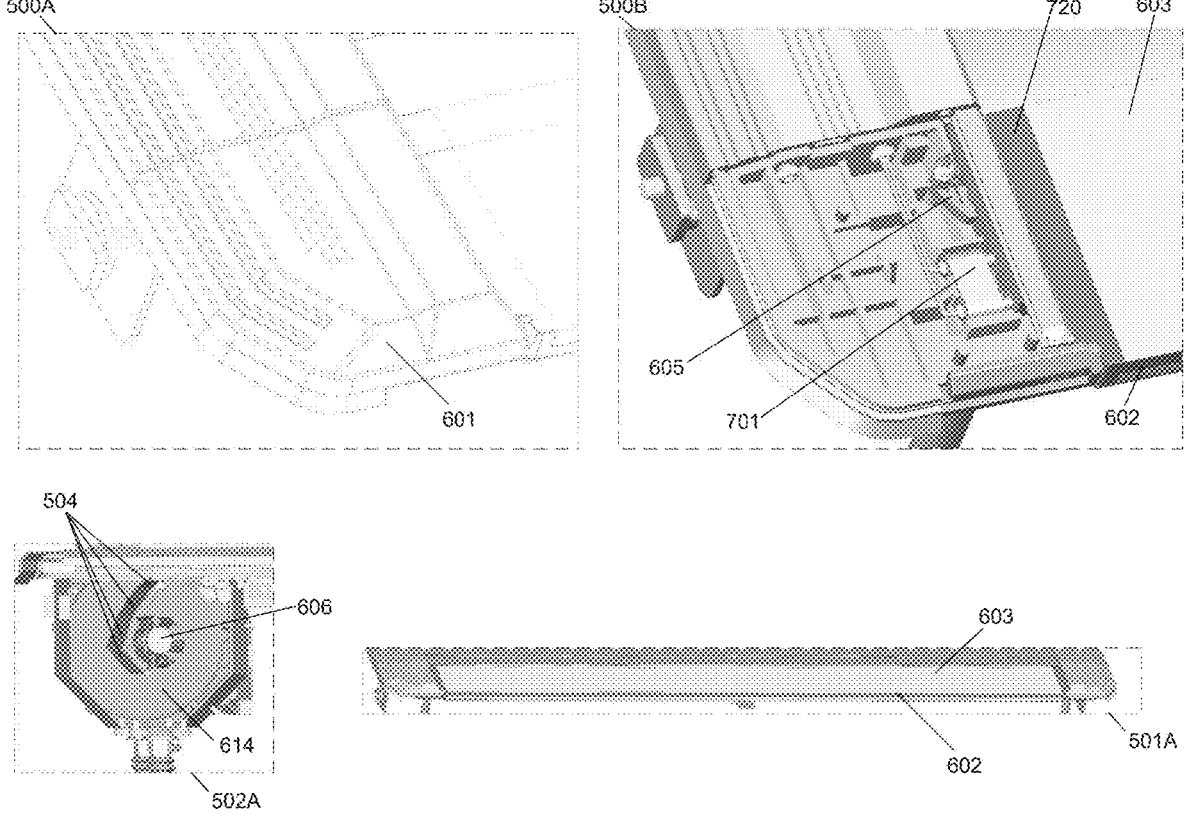
FIG. 6 shows additional views of the vehicle cover according to FIG. 5.

FIG. 6 shows additional views of the vehicle cover 501 according to FIG. 5. The area 500A in FIG. 6 corresponds to the portion of the cover 501 shown in the same labeled area 500A of FIG. 5. As shown in FIG. 6, a corner of the cover 501 may comprise a corner portion 601. In at least some examples, the corner portion 601 may comprise an end cap. In at least some other examples, the corner portion 601 shown in FIG. 6 may be in a different location of the cover 501, such as in any other location that may be near one or more lighting elements.

The area 500B in FIG. 6 corresponds to the same labeled area 500A but with a top of the corner portion 601 removed (e.g., an end cap removed). As shown in the exposed area of the corner portion 601, one or more electrical connectors may be included within an area, such as shown at component 701. The component 701 may comprise the electrical connector(s). In at least some examples, the component 701 may comprise a covering for the electrical connector(s). An end piece 603 of the cover 501 may comprise one or more lighting elements 602. In at least some examples, the end piece 603 may comprise one or more of the plurality of slats 504 that may comprise the lighting element(s) 602. Within the area 500B, at an edge 720 of the end piece 603, the one or more lighting elements 602 may be electrically connected to the one or more electrical connectors within the component 701, for example, if the cover 501 is in a closed position (e.g., fully extended).

The cover 501 may comprise a lock 605, shown in the area 500B. The lock 605 may prevent movement of the end piece 603 (and, in turn, the lock 605 may prevent movement of the plurality of slats 504 of the cover 501), for example, if the lock 605 is engaged. In such a manner, the lock 605 may prevent manual opening of the cover 501, for example, if the lock 605 is engaged. The lock 605 may be engaged via insertion into a cutout of the corner portion 601. The lock 605 may be engaged with assistance from one or more springs and/or levers. For example, the lock 605 may be spring-loaded such that engagement of the lock 605 may occur if the edge 720 of the end piece 603 is placed at a position in which the lock 605 fits within the cutout of the corner portion 601. Additionally or alternatively, the lock 605 may be engaged by a user action, such as by engaging (and/or turning) a lever and/or handle, and/or by engaging (and/or turning) a key. In such a manner, the lock 605 may be used to secure the cover 501 in a closed (and/or locked) position. The cover 501 may comprise a locking structure (not shown) that may be coupled to the lock 605 and that may be configured to receive a key to lock and/or unlock the cover 501. While the lock 605 is shown in the area 500B in the corner portion 601 of the cover 501, the lock 605 (and any corresponding structure for locking/unlocking operation such as a cutout, locking structure, key, etc.) may be located at any other portion (or at any additional portion) of the cover 501. For example, the cover 501 may comprise the lock 605 at both sides (e.g., both rear corners) of the cover 501. Additionally or alternatively, the cover 501 may comprise the lock 605 (or any other lock) at one or both corners of the cover 501 closest to a vehicle cab (e.g., opposite the rear of the vehicle). Additionally or alternatively, the cover 501 may comprise one or more locks 605 (or any other lock) at one or more intermediate positions along one or both sides of the cover 501. While the lock 605 may be particularly advantageous for use with a manual roll-up cover, such as the cover 501 described with respect to FIGS. 5-7, any of the covers described herein (e.g., covers 101, 201, 501, and/or 801) may optionally comprise the lock 605 and/or a similar or different locking structure, for example, to prevent movement of a cover (e.g., to maintain a closed position, and/or to maintain an open position).

The area 501A in FIG. 6 corresponds to the portion of the cover 501 shown in the same labeled area 501A of FIG. 5. As shown in FIG. 6, the end piece 603 of the cover 501 may comprise the one or more lighting elements 602 along a length of the end piece 603 that may be located at a rear of the vehicle, for example, if the cover 501 is in a closed position.

The area 502A in FIG. 6 corresponds to the portion of the cover 501 shown in the same labeled area 502A of FIG. 5. As shown in FIG. 6, the area 502A may comprise a reel and/or a shaft (herein collectively referred to as a "shaft 606") that may be located within a storage area 614 in which the cover 501 may also be stored, for example, if the cover 501 is in an open position (e.g., fully retracted/stored). The shaft 606 may be configured to engage and/or control the cover 501 (e.g., via engagement of underside portions of the plurality of slats 504), for example, to move the cover 501 in directions perpendicular to the length of the plurality of slats 504 so as to close the cover 501 (e.g., via rotation of the shaft 606 in a first direction) and/or open the cover 501 (e.g., via rotation of the shaft 606 in a second direction, opposite from the first direction). As shown in area 502A, the shaft 606 may comprise an outer structure that may be configured to engage an underside of the plurality of slats 504, for example, to facilitate roll-up of the cover 501 (e.g., opening the cover 501) and/or to facilitate roll-out of the cover 501 (e.g., closing the cover 501). The shaft 606 may be spring-loaded, for example, to assist with movement of the cover 501 (e.g., opening and/or closing). For example, the shaft 606 may be configured to facilitate rolling up of the cover 501 (e.g., opening the cover 501) by an initial user engagement (e.g., a pull or a tug of the end piece 603 and/or a handle or other portion of an end of the cover 501) that may trigger one or more springs to initiate a rotational force that may initiate roll-up of the cover 501. Additionally or alternatively, the shaft 606 may be configured to facilitate rolling out of the cover 501 (e.g., closing the cover 501) by an initial user engagement (e.g., a pull or a tug of the end piece 603 and/or a handle or other portion of an end of the cover 501) that may trigger one or more springs to initiate a rotational force that may initiate roll-out of the cover 501. While the shaft 606, such as a spring-loaded shaft, may be particularly advantageous for use with a manual roll-up cover, such as the cover 501 described with respect to FIGS. 5-7, any of the covers described herein (e.g., covers 101, 201, 501, and/or 801) may optionally comprise a spring-loaded shaft, such as the shaft 606, and/or a similar or different manually operated structure, for example, to enable manual control of movement of a cover (e.g., to open a cover, close a cover, or move a cover to a different position). As a non-limiting example, a cover may comprise both a manual and an electric operation, whereby the cover may be configured to operate in either or both manual mode and electric mode (e.g., such as by engaging or disengaging a switch, latch, and/or other control mechanism).

Figure 7:
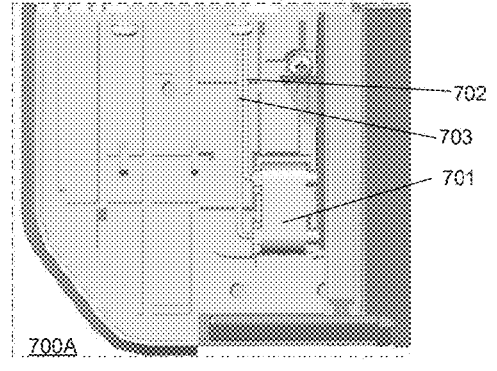
FIG. 7 shows additional views of the vehicle cover according to FIGS. 5 and 6.
Figure 7:
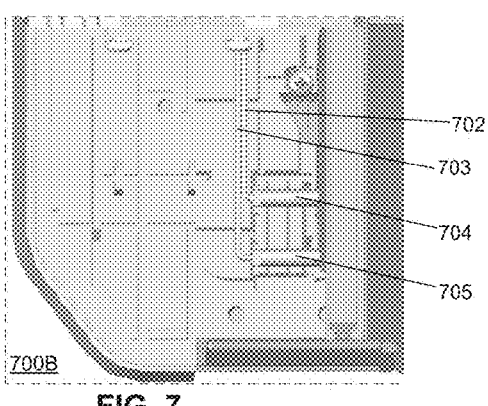
Figure 7:
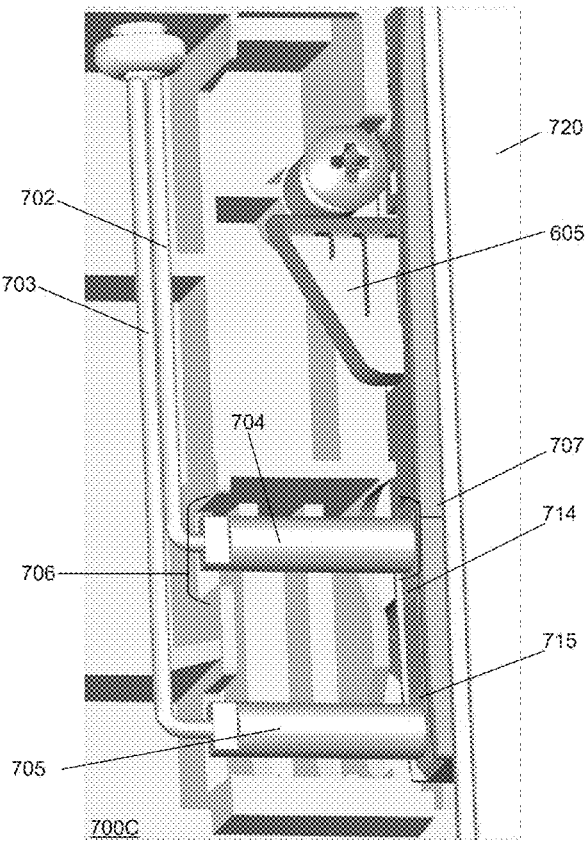

FIG. 7 shows additional views of the vehicle cover according to FIGS. 5 and 6. Area 700A shows a top view of the exposed area of the corner portion 601 of the cover 501. Area 700B shows the same top view as the area 700A, but with the component 701 comprising a covering (shown in area 700A) that has been removed in area 700B to reveal electrical connectors 704 and 705. Area 700C shows a zoomed in view of the exposed area of the corner portion 601 of the cover 501, showing the edge 720 of the end piece 603 of the cover 501 in a position to electrically connect the one or more lighting elements 602 to the electrical connectors 704 and 705 via respective electrical contacts 714 and 715. In particular, the end piece 603 may comprise a first electrical contact 714 that may be configured to engage a first electrical connector 704 (e.g., if the cover 501 is in a particular position such as a closed position) that may be electrically coupled to a first conductor 702 (e.g., cable, wire, etc.). The end piece 603 may comprise a second electrical contact 715 that may be configured to engage a second electrical connector 705 (e.g., if the cover 501 is in a particular position such as a closed position) that may be electrically coupled to a second conductor 703 (e.g., cable, wire, etc.). While only two electrical contacts (714, 715), two corresponding electrical connectors (704, 705), and two corresponding conductors (702, 703) are shown in FIG. 7, the cover 501 may comprise any number of electrical contacts, electrical connectors, and/or conductors. For example, at least one electrical contact, electrical connector, and/or conductor may be configured to enable a positive voltage to be supplied to the one or more lighting elements 602, for example, if the cover 501 is in a position such that the electrical contact is electrically coupled to a respective electrical connector and/or conductor. In at least some examples, at least one electrical contact, electrical connector, and/or conductor may be configured as a data signaling connection that may be electrically connected to the one or more lighting elements 602, for example, if the cover 501 is in a position such that the electrical contact is electrically coupled to a respective electrical connector and/or conductor for controlling operation of the one or more lighting elements 602 (e.g., via the electronic control system described herein). In at least some examples, at least one electrical contact, electrical connector, and/or conductor may be configured as a ground connection that may be electrically connected to the one or more lighting elements 602, for example, if the cover 501 is in a position such that the electrical contact is electrically coupled to a respective electrical connector and/or conductor that may be connected to an electrical ground. In at least some examples, a plurality of electrical connectors may be used to electrically couple to the same electrical contact and/or to the same conductor. In at least some examples, an electrical connector and/or an electrical contact may be configured to receive data signaling over a voltage supply, such as by pulse width modulation (PWM).

The one or more electrical connectors (704, 705) may be configured to have a surface suitable for making an electrical connection with a respective electrical contact (714, 715). In at least some examples, an electrical contact (714, 715) may comprise a substantially flat metal surface and/or an electrical connector (704, 705) may comprise a rounded surface that may facilitate electrical connection with relatively low friction, which may help to reduce component wear and/or reduce risk of failure. In at least some examples, an electrical connector (704, 705) may be spring-loaded, which may help to maintain a reliable electrical connection with a respective electrical contact (714, 715). The cover 501 may be configured with one or more structures (706, 707) that may support and/or secure a relative positioning of one or more electrical connectors (704, 705). The one or more structures may comprise any shape, such as a cutout (e.g., 706), a hole (e.g., 707), and/or any other shape and/or additional component (e.g., bracket, screw, etc.). Illumination and/or control of the one or more lighting elements 602 may be initiated, for example, if the edge 720 of the end piece 603 of the cover 501 is located at (e.g., moved to) a position such that one or more electrical contacts (714, 715) are electrically coupled to a respective electrical connector (704, 705), such as if the cover 501 is in a closed position. Illumination and/or control of the one or more lighting elements 602 may be terminated if the edge 720 of the end piece 603 of the cover 501 is moved such that one or more electrical contacts (714, 715)

are no longer electrically coupled to a respective electrical connector (704, 705), such as if the cover is moved from a closed position to a partially open position or a fully open position.

While the cover 501 described with respect to FIGS. 5-7 comprises one or more electrical connectors (704, 705), one or more electrical contacts (714, 715), and one or more conductors (702, 703) located at a corner portion 601 of the cover (e.g., a driver side rear corner), one or more electrical connectors and/or one or more electrical contacts may be located at any other portion of the cover 501. For example, one or more electrical connectors, electrical contacts, and/or conductors may be located at one or more other (or additional) corners of the cover 501, such as at a rear passenger side of the vehicle, vehicle cab end driver side of the vehicle, and/or vehicle cab end passenger side of the vehicle. Additionally or alternatively, one or more electrical connectors and/or electrical contacts may be located at one or more positions along one or more sides of the cover 501 (e.g., along driver side and/or passenger side of a truck bed). For example, one or more electrical connectors may be located at multiple locations along a side (or both sides) of the cover 501, such that the one or more lighting elements 602 may be illuminated and/or controlled at any position at which one or more respective electrical contacts of the cover 501 are electrically coupled to one or more electrical connectors. Additionally, one or more electrical contacts may be located at one or more positions along one side (or both sides) of the cover 501, such that the one or more lighting elements 602 may be illuminated and/or controlled at additional positions at which respective electrical contacts of the cover 501 are electrically coupled to electrical connectors. Additionally or alternatively, the cover 501 may be configured with one or more energy storage devices (e.g., battery/batteries, capacitor(s), etc.) that may be used to energize the one or more lighting elements 602, for example, if the one or more lighting elements 602 are at locations that may not have electrical connector(s) being electrically coupled to electrical contact(s), such as during movement of the cover 501. In such a configuration, the one or more lighting elements 602 may be configured to remain illuminated and/or controlled during movement of the cover 501 and/or at one or more position(s) of the cover 501 in between being closed and open.

Figure 8:
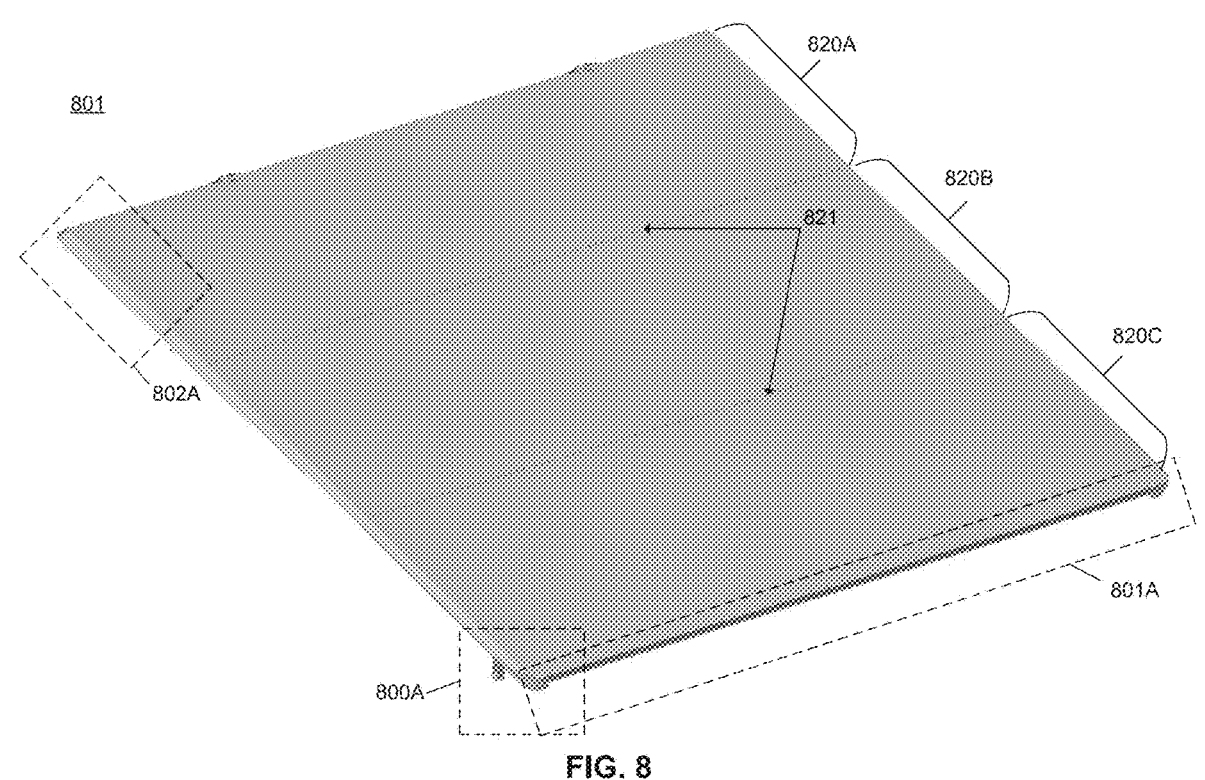
FIG. 8 shows an example top portion of a vehicle cover with lighting.
Figure 9:
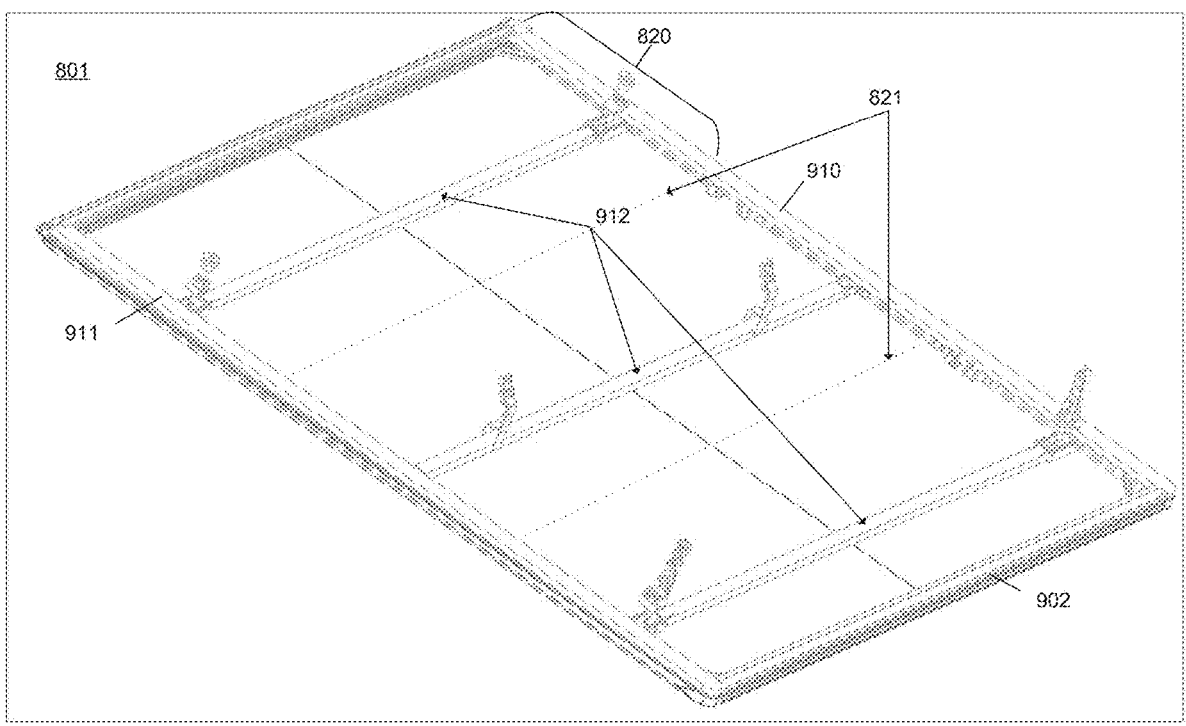
FIG. 9 shows an example bottom portion of the vehicle cover according to FIG. 8.

FIG. 8 shows an example top portion of a vehicle cover. FIG. 9 shows an example bottom portion of the vehicle cover according to FIG. 8. A vehicle cover 801 may comprise the cover 101 shown and described with respect to FIG. 1. The cover 801 may comprise, as non-limiting examples, a fold-up cover such as a tri-fold, and/or a roll-up cover such as a soft roll-up cover. While the cover 801 is shown as having three approximately similarly-sized portions 820 (shown as 820A, 820B, and 820C) that may be joined by two foldable joints 821, the cover 801 may be configured as a fold-up cover with any other number of portions and/or foldable joints (e.g., a four-sectioned cover with three joints, a five-sectioned cover with four folders, etc.). Additionally or alternatively, the cover 801 may comprise a rollable material and may be configured as a soft roll-up cover. The cover 801 may correspond to the cover 501 described with respect to FIGS. 5-7, for example, except that the cover 801 may lack a shaft (such as the shaft 606 of FIG. 6) and/or a storage area (such as the storage area 614 of FIG. 6), based on a general structure of the cover 801 being a fold-up cover that may be stored/opened in a stackable configuration, and/or based on a general structure of the cover 801 being a soft roll-up cover that may be rolled up. Accordingly, FIGS. 5-7 and all descriptions thereof with respect to the cover 501 are hereby incorporated by reference with respect to the cover 801 except for differences noted herein, such as the above-noted potential differences.

The cover 801 may comprise a frame that may be configured to be mounted to, or rest upon, sides of a truck bed. The frame may comprise a first rail 910 and a second rail 911, as shown in FIG. 9. The first rail 910 may be configured to be located along the truck bed on a driver side of a truck. The second rail 911 may be configured to be located along the truck bed on a passenger side of the truck. The cover 801 may comprise a plurality of portions 820, shown as 820A, 820B, and 820C, that may be joined via foldable joints 821. The plurality of portions 820 (e.g., each of the plurality of portions 820A, 820B, and 820C) may be supported by one or more (e.g., a respective) support structure 912. The one or more support structures 912 may be connected on a first side to the first rail 910 and on a second side to the second rail 911. The one or more support structures 912 may comprise one or more attachment portions that may be used to secure the cover 801 in a closed position and/or in an open position (e.g., a stacked position).

The plurality of portions 820 may be configured to be stacked. For example, a top surface of a second portion 820B may be rotated relative to a first portion 820A along the joint 821 that joins these two portions 820 such that the top surface of the second portion 820B may rest on top of a top surface of the first portion 820A. A bottom surface of a third portion 820C may be rotated relative to the second portion 820B along the joint 821 that joins these two portions 820 such that the bottom surface of the third portion 820C may rest on a bottom surface of the second portion 820B. In such a configuration, the plurality of portions 820 may be stacked, in an open position of the cover 801, whereby an outer/topmost layer of the stack may comprise a top surface of the third portion 820C, with the bottom surface of the third portion 820C facing the bottom surface of the second portion 820B, all of which are stacked on top of the first portion 820A having its top surface facing the top surface of the second portion 820B. In such a configuration, one or more lighting elements on the third portion 820C (described further herein) may be visible on the top layer of the stacked cover 801. While the cover 801 may be stacked in a stacked configuration described herein, the plurality of portions 820 of the cover 801 may be stacked in any other configuration (e.g., with the first portion 820A on top, with the second portion 820B on top, etc.). The stacked configuration of the cover 801 may be located at a position above a truck bed. Additionally or alternatively, the stacked configuration of the cover 801 may be located at a position within a truck bed, such as in a storage area, and/or with the plurality of portions 820 configured in a generally vertical position (e.g., perpendicular to a truck bed), and/or in any other configuration.

Each portion of the plurality of portions 820 may comprise a first end and a second end (e.g., at a respective driver side and a passenger side of a vehicle). The first end of each portion 820 may be coupled to the first rail 910, and the second end of each portion 820 may be coupled to the second rail 911. In at least some examples, the cover 801 may be configured without a frame such that the first end of each portion 820 may be configured to moveably rest on a first side of the truck bed (e.g., driver side), and the second end of each portion 820 may be configured to moveably rest on a second side of the truck bed (e.g., passenger side).

The cover 801 may comprise an electronic control system that may be configured to illuminate one or more lighting elements. As a non-limiting example, the one or more lighting elements may be located at a rear portion of a vehicle (e.g., if the cover is in a closed/flat position) and/or that may be located at a position close to a vehicle cab (e.g., if the cover is in an open/stacked position). The one or more lighting elements may be configured to operate as additional vehicle lighting corresponding to lighting for one or more vehicle operations such as one or more of a brake light, a turn light signal, a reverse signal, a running light, an animation, and/or any other indication. The electronic control system may comprise at least one power cable and/or wire configured to be fixedly attached to the frame (and/or to one or more of the first rail 910 and/or the second rail 911) and electrically coupled to the electric power (e.g., from a vehicle battery). As an example, at least one cable and/or wire (e.g., for power and/or data) may be located within one or more sides of the frame, such as within an inner portion of the first rail 910 and/or within an inner portion of the second rail 911 so as to avoid exposing the cable and/or wire to potential damage (e.g., based on movement of the cable/wire, movement of the cover and/or one or more components of the cover, and/or exposure to weather). In at least some examples, at least one cable and/or wire (e.g., for power and/or data signaling to one or more lighting elements of the cover 801) may be located within a vehicle body so as to avoid exposing the cable and/or wire to potential damage (e.g., based on movement of the cable/wire, movement of the cover and/or one or more components of the cover, and/or exposure to weather). In such examples, the cover 801 may be electrically coupled to the power and/or data signaling via at least one mounting structure such as described further herein. The electronic control system may comprise at least one electrical connector and/or at least one electrical contact that is electrically coupled to the one or more lighting elements, as described further herein. The at least one electrical connector and/or the at least one electrical contact may be configured to be: electrically coupled to the electric power via the at least one power cable if the truck bed cover is in a closed position; and electrically decoupled from the electric power if the truck bed cover is in an open position. The electronic control system may comprise one or more of a controller and/or a wired or wireless transceiver that may be controlled by a user-selectable device such as a key fob, a phone app, a wireless device, and/or a controller installed on or within the vehicle.

The area 800A shows a corner of the cover 801 that may be located at the rear driver-side of a vehicle such as the vehicle 101. The area 801A shows the end of the cover 801 that may be located at a rear of a vehicle such as the vehicle 101. One or more cables and/or wires, such as at least one power cable/wire and/or at least one control signaling cable/wire, may be configured within or under the first rail 910 and/or within or under the second rail 911. The one or more cables/wires may be configured to power and/or control one or more lighting elements located on the end of the cover 801 in the area 801A. The area 800A may comprise a corner portion that may be used to cover a coupling of at least one electrical contact with the one or more cables/wires/conductors and/or with the one or more lighting elements in a manner that provides power and/or control to the one or more lighting elements without exposed or moveable wiring. As a result, power and/or control signaling may be provided to the one or more lighting elements on the cover 801 (e.g., in the area 801A) in a manner than may avoid potential damage to wiring when the cover 801 moves between positions of open and closed, as explained further herein.

Figure 10:
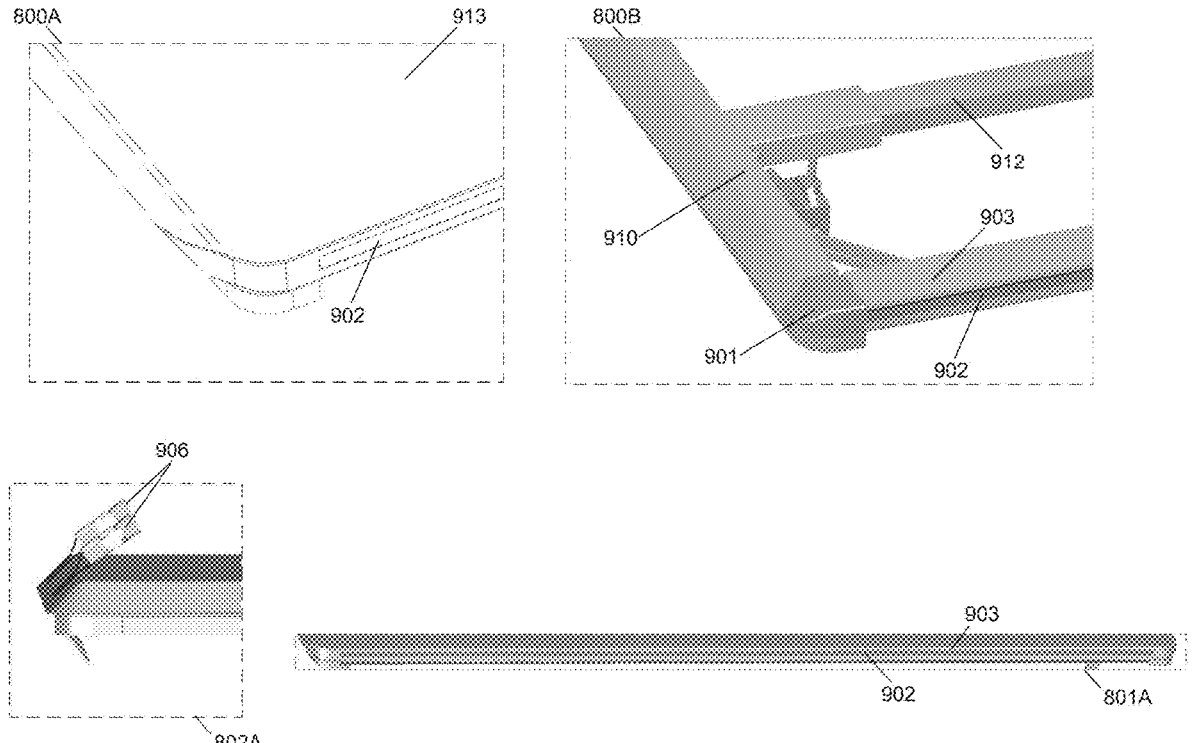
FIG. 10 shows additional views of the vehicle cover according to FIGS. 8 and 9.

FIG. 10 shows additional views of the vehicle cover 801 according to FIGS. 8 and 9. The area 800A in FIG. 10 corresponds to the portion of the cover 801 shown in the same labeled area 800A of FIG. 8. The area 800B in FIG. 10 corresponds to the same labeled area 800A but with a top surface 913 removed from the cover 801 to expose additional details of the cover 801. As shown in FIG. 10, a corner of the cover 801 may comprise a corner portion 901 in the area 800B (e.g., underneath the top surface 913). In at least some examples, the corner portion 901 may comprise an end cap. In at least some other examples, the corner portion 901 shown in FIG. 10 may be in a different location of the cover 801, such as in any other location that may be near one or more lighting elements. One or more electrical connectors may be included within an area covered by the corner portion 901. The corner portion 901 may comprise the electrical connector(s). In at least some examples, the corner portion 901 may comprise a covering for the electrical connector(s). An end piece 903 of the cover 801 may comprise one or more lighting elements 902. In at least some examples, a portion 820 of the cover 801 (e.g., the third portion 820C) may comprise an end piece 903 that may comprise the lighting element(s) 902. Within the area 800B, at an edge of the end piece 903, the one or more lighting elements 902 may be electrically connected to the one or more electrical connectors within the corner portion 901, for example, if the cover 801 is in a closed position (e.g., substantially flat).

The cover 801 may comprise a lock (not shown), such as the lock 605 described with respect to FIGS. 5-7. Such a lock may prevent movement of the end piece 903 and/or of one or more of the portions 820 of the cover 801, for example, if the lock is engaged. In such a manner, the lock may prevent manual opening of the cover 801, for example, if the lock is engaged. The lock may be engaged via insertion into a cutout of the corner portion 901. The lock may be engaged with assistance from one or more springs and/or levers. For example, the lock may be spring-loaded such that engagement of the lock may occur if the edge of the end piece 903 is placed at a position in which the lock fits within the cutout of the corner portion 901. Additionally or alternatively, the lock may be engaged by a user action, such as by engaging (and/or turning) a lever and/or handle, and/or by engaging (and/or turning) a key. In such a manner, the lock may be used to secure the cover 801 in a closed (and/or locked) position. The cover 801 may comprise a locking structure (not shown) that may be coupled to the lock and that may be configured to receive a key to lock and/or unlock the cover 801. While the lock is described with respect to the area 800B in the corner portion 901 of the cover 801, the lock (and any corresponding structure for locking/unlocking operation such as a cutout, locking structure, key, etc.) may be located at any other portion (or at any additional portion) of the cover 801. For example, the cover 801 may comprise the lock at both sides (e.g., both rear corners) of the cover 801. Additionally or alternatively, the cover 801 may comprise the lock (or any other lock) at one or both corners of the cover 801 closest to a vehicle cab (e.g., opposite the rear of the vehicle). Additionally or alternatively, the cover 801 may comprise one or more locks (or any other lock) at one or more intermediate positions along one or both sides of the cover 801.

The area 801A in FIG. 10 corresponds to the portion of the cover 801 shown in the same labeled area 801A of FIG. 8. As shown in FIG. 10, the end piece 903 of the cover 801 (e.g., at least partially underneath the top surface 913 of the cover 801) may comprise the one or more lighting elements 902 along a length of the end piece 903 that may be located at a rear of the vehicle, for example, if the cover 801 is in a closed position.

The area 802A in FIG. 10 corresponds to the portion of the cover 801 shown in the same labeled area 802A of FIG. 8. As shown in FIG. 10, the area 802A may comprise one or more attachment portions 906 that may be used to secure one or more portions 820 of the cover 801 to each other and/or to a vehicle on which the cover 801 may be mounted.

Figure 11:
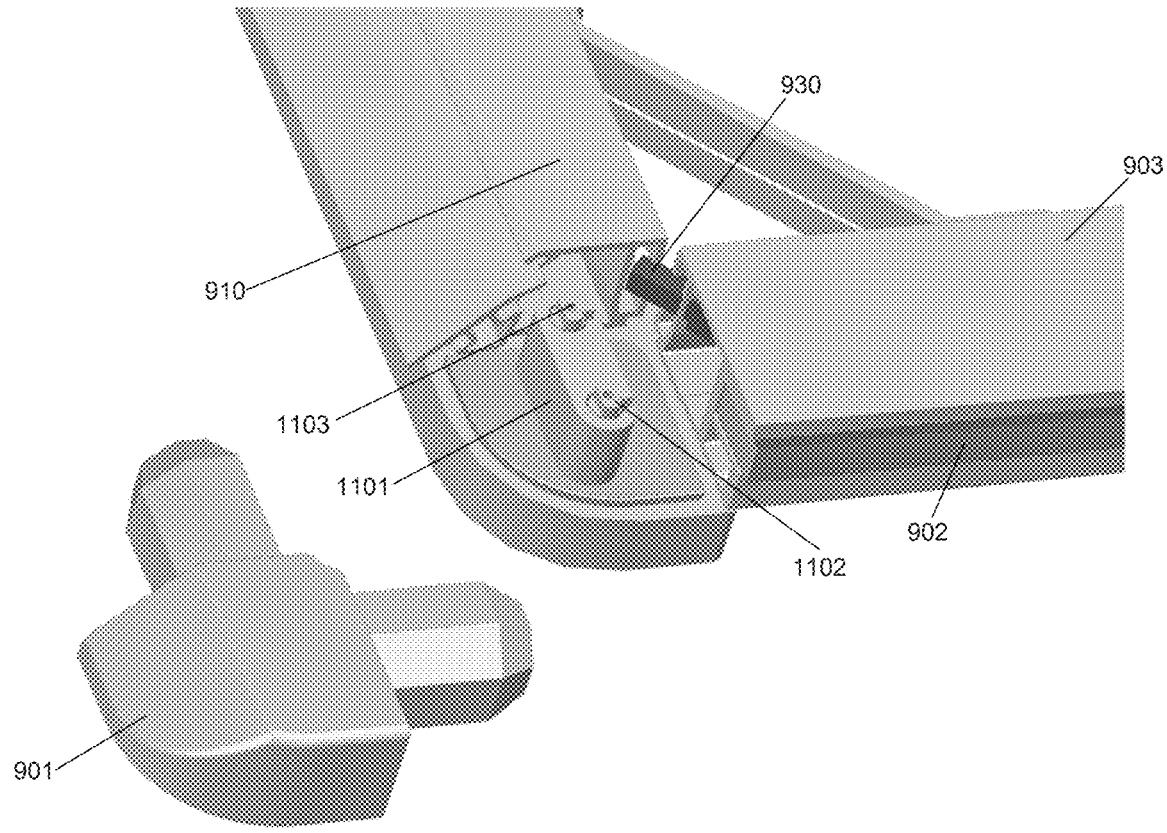
FIG. 11 shows additional views of the vehicle cover according to FIGS. 8-10.
Figure 12:
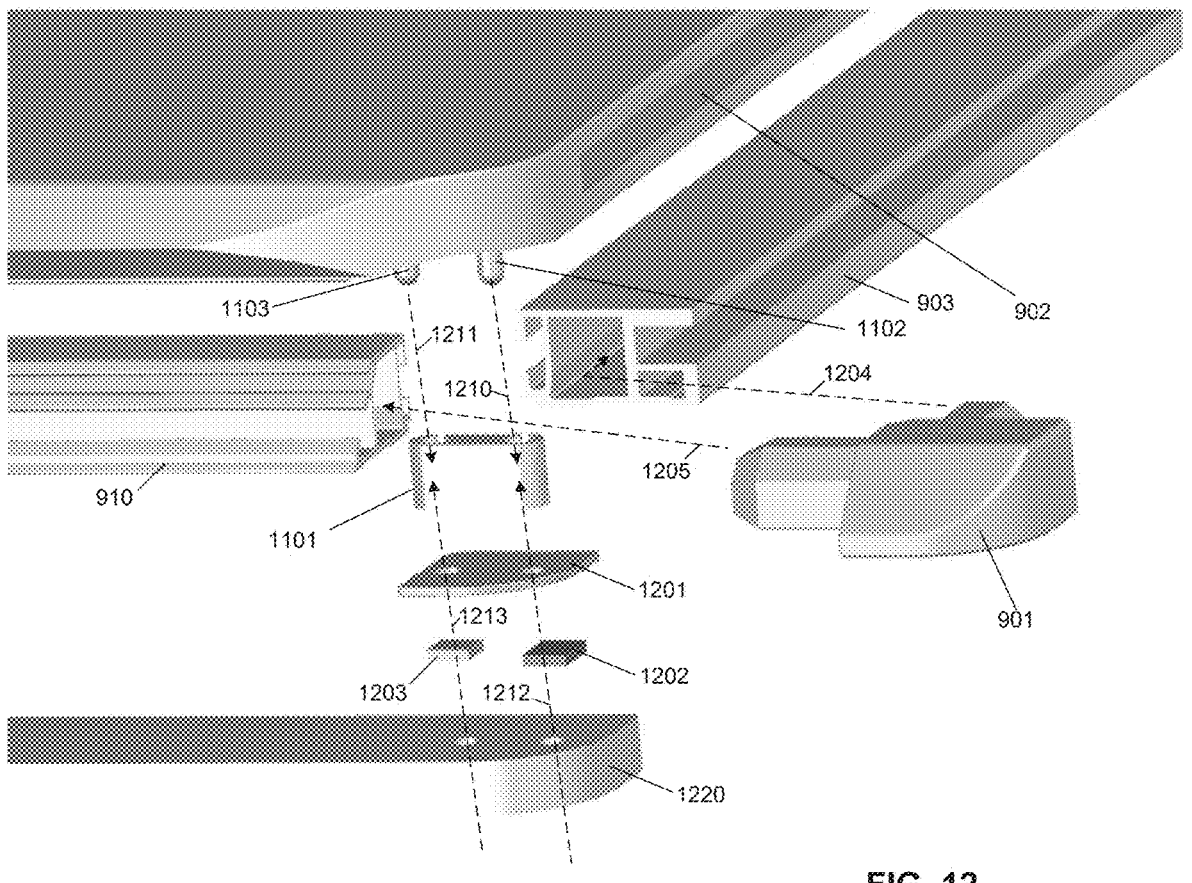
FIG. 12 shows additional views of the vehicle cover according to FIGS. 8-11.

FIG. 11 and FIG. 12 show additional views of the vehicle cover 801 according to FIGS. 8-10. FIG. 11 shows a zoomed in view of the area 800B from FIG. 10, with the corner portion 901 removed from the cover 801 to expose additional details of an example configuration. FIG. 12 shows an exploded view of the zoomed in area from FIG. 11 at a different angle to show additional details of an example configuration.

As shown in FIG. 11, the corner portion 901 is removed to reveal one or more electrical connectors 1102 and 1103. The one or more electrical connectors 1102 and 1103 may be coupled to respective cables/wires (not shown), such as via one or more cable/wire connectors 930, for controlling the one or more lighting elements 902. For example, the one or more electrical connectors 1102 and 1103 may be configured to be attached to an underside of the corner portion 901, and the corner portion 901 may be configured to be secured to the end piece 903 of the cover 801 (and/or to a support structure of the cover 801 such as the first rail 910), such that the corner portion 901 may cover one or more cables/wires that may be electrically connected from the electrical connectors 1102 and 1103 to the one or more lighting elements 902. The cover 801 may be configured such that, when the cover 801 is in a closed position, the one or more electrical connectors 1102 and 1103 are inserted into a receptacle 1101 (or any other structure) to secure the cover 801 in a closed position and/or to electrically couple the one or more electrical connectors 1102 and 1103 to a power supply and/or to control signaling for illumination and/or control of the one or more lighting elements 902. In at least some examples, the receptacle 1101 may be configured to electrically connect at least one electrical connector (e.g., 1102) and/or at least one electrical contact to at least one other electrical connector (e.g., 1103) and/or at least one other electrical connector.

As shown in FIG. 12, the corner portion 901 may be configured to fit within a portion of a cavity of the end piece 903 (as shown with arrow 1204) and/or may be configured to fit within a portion of a cavity of a rail such as the first rail 910 (as shown with arrow 1205). A first electrical connector 1102 of the one or more electrical connectors may be configured to be electrically connected to a first electrical contact 1202. For example, the first electrical connector 1102 may be configured to be inserted through the receptacle 1101, through one or more spacers/structures 1201, through a base portion 1220, and/or through or up to an electrical contact 1202 (e.g., such as shown by arrows 1210 and 1212). A second electrical connector 1103 of the one or more electrical connectors may be configured to be electrically connected to a second electrical contact 1203. For example, the second electrical connector 1103 may be configured to be inserted through the receptacle 1101, through one or more spacers/structures 1201, through a base portion 1220, and/or through or up to an electrical contact 1203 (e.g., such as shown by arrows 1210, 1211, and 1213). While arrows 1210, 1211, 1212, and 1213 are shown in certain directions and in relation to a particular ordering of components, any ordering may be implemented such that any of the components shown in FIG. 12 may be included (or not included) in any order relative to any other component.

An underside of the cover 801 may comprise the first electrical connector 1102 that may be configured to engage a first electrical contact 1202 (e.g., if the cover 801 is in a particular position such as a closed position) that may be electrically coupled to a first conductor (e.g., cable, wire, etc.). The underside of the cover 801 may comprise a second electrical connector 1103 that may be configured to engage a second electrical contact 1203 (e.g., if the cover 801 is in a particular position such as a closed position) that may be electrically coupled to a second conductor (e.g., cable, wire, etc.). While only two electrical connectors (1102, 1103) and two corresponding electrical contacts (1202, 1203) are shown in FIG. 12, and while two corresponding conductors are referenced, the cover 801 may comprise any number of electrical contacts, electrical connectors, and/or conductors. For example, at least one electrical contact, electrical connector, and/or conductor may be configured to enable a positive voltage to be supplied to the one or more lighting elements 902, for example, if the cover 801 is in a position such that the electrical contact is electrically coupled to a respective electrical connector and/or conductor. In at least some examples, at least one electrical contact, electrical connector, and/or conductor may be configured as a data signaling connection that may be electrically connected to the one or more lighting elements 902, for example, if the cover 801 is in a position such that the electrical contact is electrically coupled to a respective electrical connector and/or conductor for controlling operation of the one or more lighting elements 902 (e.g., via the electronic control system described herein). In at least some examples, at least one electrical contact, electrical connector, and/or conductor may be configured as a ground connection that may be electrically connected to the one or more lighting elements 902, for example, if the cover 801 is in a position such that the electrical contact is electrically coupled to a respective electrical connector and/or conductor that may be connected to an electrical ground. In at least some examples, a plurality of electrical connectors may be used to electrically couple to the same electrical contact and/or to the same conductor. In at least some examples, an electrical connector and/or an electrical contact may be configured to receive data signaling over a voltage supply, such as by pulse width modulation (PWM).

The one or more electrical connectors (1102, 1103) may be configured to have a surface suitable for making an electrical connection with a respective electrical contact (1202, 1203). In at least some examples, an electrical contact (1202, 1203) may comprise a substantially flat metal surface and/or an electrical connector (1102, 1103) may comprise a rounded surface that may facilitate electrical connection with relatively low friction, which may help to reduce component wear, reduce risk of failure, and/or increase likelihood of establishing an electrical connection. In at least some examples, an electrical connector (1102, 1103) may be spring-loaded, which may help to maintain a reliable electrical connection with a respective electrical contact (1203, 1203). The cover 801 may be configured with one or more structures (1101, 1201, 1220) that may support and/or secure a relative positioning of one or more electrical connectors (1102, 1103). The one or more structures may comprise any shape, such as a cutout, a hole, and/or any other shape and/or additional component (e.g., bracket, screw, etc.). Illumination and/or control of the one or more lighting elements 902 may be initiated, for example, if the end piece 903 of the cover 801 is located at (e.g., moved to) a position such that one or more electrical contacts (1202, 1203) are electrically coupled to a respective electrical connector (1102, 1103), such as if the cover 801 is in a closed position. Illumination and/or control of the one or more lighting elements 902 may be terminated if the end piece 903 of the cover 801 is lifted such that one or more electrical contacts (1202, 1203) are no longer electrically coupled to a respective electrical connector (1102, 1103), such as if the cover is lifted up from a closed position to a partially open position or a fully open position.

While the cover 801 described with respect to FIGS. 8-12 comprises one or more electrical connectors (1102, 1103), one or more electrical contacts (1202, 1203), and one or more conductors located at a corner portion 901 of the cover (e.g., a driver side rear corner), one or more electrical connectors and/or one or more electrical contacts may be located at any other portion of the cover 801. For example, one or more electrical connectors, electrical contacts, and/or conductors may be located at one or more other (or additional) corners of the cover 801, such as at a rear passenger side of the vehicle, vehicle cab end driver side of the vehicle, and/or vehicle cab end passenger side of the vehicle. Additionally or alternatively, one or more electrical connectors and/or electrical contacts may be located at one or more positions along one or more sides of the cover 801 (e.g., along driver side and/or passenger side of a truck bed). For example, one or more electrical connectors may be located at multiple locations along a side (or both sides) of the cover 801 (e.g., at an underside portion of the second portion 820B and/or at an underside portion of the first portion 820A) such that the one or more lighting elements 902 may be illuminated and/or controlled at any position at which one or more respective electrical contacts of the cover 801 are electrically coupled to one or more electrical connectors. Additionally, one or more electrical contacts may be located at one or more positions along one side (or both sides) of the cover 801, such that the one or more lighting elements 902 may be illuminated and/or controlled at additional positions at which respective electrical contacts of the cover 801 are electrically coupled to electrical connectors. Additionally or alternatively, the cover 801 may be configured with one or more energy storage devices (e.g., battery/batteries, capacitor(s), etc.) that may be used to energize the one or more lighting elements 902, for example, if the one or more lighting elements 902 are at locations that may not have electrical connector(s) being electrically coupled to electrical contact(s), such as during movement of the cover 801. In such a configuration, the one or more lighting elements 902 may be configured to remain illuminated and/or controlled during movement of the cover 801 and/or at one or more position(s) of the cover 801 in between being closed and open.

In at least some examples, the cover 801 may be a tri-fold cover such as shown in FIG. 8. In at least some other examples, the cover 801 may be a roll-up cover (e.g., a soft roll-up cover), such that the plurality of portions 820 may be bendable/rollable and configured to be collectively rolled up, such as for storage and/or access to a truck bed. In at least some examples, the cover 801 may be configured to be mounted onto vehicle without a frame. For example, a first end/side of the cover 801 may be configured to rest on a first side of a truck bed (e.g., driver side of the truck bed) and a second end/side of the cover 801 may be configured to rest on a second side of the truck bed. In examples where the cover 801 may be mounted to a frame, one or more wires/cables that may be used to power the one or more lighting elements may be secured within the frame so as not to be exposed. In examples where the cover 801 may be mounted onto a vehicle without a frame, one or more wires/cables that may be used to power the one or more lighting elements may be secured within a vehicle body frame or otherwise internal to the vehicle exterior (and/or internal to the exterior of a truck bed). In such examples without use of a frame, the cover may be electrically connected to power and/or data/control signaling (and/or at least partially physically secured to a vehicle) via at least one mounting structure. The at least one mounting structure may be configured to be fixedly attached to at least one of: a first side of a truck bed (e.g., driver side of a truck bed) and/or a second side of a truck bed (e.g., passenger side of a truck bed). For example, the at least one mounting structure may be connected to a vehicle one or both of the two rear corners of the vehicle (e.g., rear corner(s) of a truck bed). The at least one mounting structure may comprise any size and/or shape. In at least one example, the at least one mounting structure may comprise a size and/or shape configured to receive and/or be connected to the corner portion 901 shown in FIG. 10. For example, the at least one mounting structure may comprise at least a portion of the base portion 1220, shown and described with respect to FIG. 10, for connection with the corner portion 901. As another example, the at least one mounting structure may comprise a structure similar the corner portion 901 (and/or a structure of similar size and/or shape), for example, with or without the horizontal extensions that are shown in FIG. 12 for connection within the first rail 910 and/or end piece 903 (e.g., at arrows 1205 and 1204). One or more electrical contacts (e.g., 1202, 1203) may be included within the at least one mounting structure. The one or more electrical contacts (e.g., 1202, 1203) may be electrically connected to one or more wires/cables that may be electrically connected to power (e.g., a vehicle battery). Accordingly, if the cover 801 is closed, the one or more electrical connectors (e.g., 1102, 1103) may be configured to be electrically coupled to the one or more electrical contacts (e.g., 1202, 1203) by connecting the cover 801 to the at least one mounting structure (e.g., whereby one or more electrical connectors of the cover 801 electrically connect to one or more electrical contacts of the at least one mounting structure). If the cover 801 is opened, the one or more electrical connectors (e.g., 1102, 1103) may be configured to be electrically decoupled from the one or more electrical contacts (e.g., 1202, 1203) by disconnecting the cover 801 from the at least one mounting structure (e.g., whereby one or more electrical connectors of the cover 801 electrically disconnect from one or more electrical contacts of the at least one mounting structure).

Each of the covers described herein have advantages over other covers by providing power and/or control for illumination of one or more lighting elements with improved reliability and operation. For example, covers described herein are not forced to remain stationary in order to avoid exposing and/or damaging wiring/cabling used for illumination and/or control of one or more lighting elements. For example, covers described herein are configured to be able to move between positions of open and closed (and positions in between), in a manner that avoids exposing wiring/cabling for power and/or data/control signaling, and thereby reducing a likelihood of damage to wiring/cabling over time from repeated movement of the cover. Additionally, covers described herein are configured in a manner that avoids complicated wiring support structures that may otherwise be necessary to reduce a risk of damage to wiring. As a result, covers described herein provide advantages such as reduced cost for manufacture, improved ease of installation, and/or reduced risk of damage to wiring/cabling during use and/or during installation. By using the covers and/or the electronic control system described herein, power and/or control may be provided to the one or more lighting elements of a cover in a reliable manner without risk of damage to power and/or control cables/wiring during installation and/or by repeated movement of the vehicle cover, such as by opening and/or closing the cover, thereby providing advantages such as high-reliability, high durability of operation, and/or other advantages that may be evident from the disclosure herein.

A cover, such as the cover 201, the cover 501, and/or any other cover described herein (e.g. a truck bed cover), may comprise one or more of the following features. The cover may comprise a frame configured to be mounted to a truck bed. The cover may comprise a first rail configured to be located along the truck bed on a driver side of a truck; and a second rail configured to be located along the truck bed on a passenger side of the truck. The cover may comprise a plurality of slats. Each slat of the plurality of slats may comprise a first end and a second end. The first end of each slat may be configured to moveably rest on the first rail and/or on a first side of the truck bed, and the second end of each slat may be configured to moveably rest on a second side of the second rail and/or on a second side of the truck bed, to facilitate movement of the plurality of slats relative to the frame. The cover may comprise one or more lighting elements. The cover may comprise an electronic control system configured to move the plurality of slats and/or configured to illuminate the one or more lighting elements. The electronic control system may comprise at least one motor configured to receive electric power to control movement of the plurality of slats along the first rail and/or the first side of the truck bed and along the second rail and/or the second side of the truck bed. In at least some examples, such as in a manual cover, the electronic control system may not include a motor. The electronic control system may comprise at least one power cable configured to be fixedly attached to the frame and electrically coupled to electric power. The electronic control system may comprise at least one electrical contact that may be electrically coupled to the one or more lighting elements and that may be configured to be: electrically coupled to the electric power via the at least one power cable if the cover is in a closed position; an electrically decoupled from the electric power if the truck bed cover is in an open position. The at least one power cable may be configured to be coupled to the electric power based on at least one light operation of the truck. The electronic control system may be further configured to: illuminate the one or more lighting elements if the cover is in the closed position and if the at least one light operation of the truck is engaged. The at least one light operation may comprise one or more of: a brake light operation; a running light operation; a turn signal light operation; a reverse light operation; and/or an animation light operation. The plurality of slats may comprise an end slat. The end slat may comprise the one or more lighting elements. The electronic control system may further comprise at least one motor configured to receive the electric power to control movement of the plurality of slats along the first side of the truck bed and along the second side of the truck bed; and a wired or wireless receiver that may be configured to receive a command to control the at least one motor. The command may correspond to: a command to open the cover via rotation of at least one shaft of the at least one motor in a first direction; or a command to close the cover via rotation of the at least one shaft of the at least one motor in a second direction that is an opposite rotation relative to the first direction. The electronic control system may further comprise at least one energy storage device electrically that may be coupled to the one or more lighting elements and that may be configured to provide power for illumination of the one or more lighting elements for a time duration after the at least one electrical contact is electrically decoupled from the electric power. The at least one energy storage device may comprise at least one of: a battery; or a capacitor. The one or more lighting elements may be configured to be electrically coupled to the electric power via the at least one power cable and via an intermediate connector if the cover is in an intermediate position, between the open position and the closed position. The one or more lighting elements may be configured to be illuminated if the cover is in the intermediate position. The cover may further comprise at least one electrical connector fixedly attached to the frame, electrically coupled to the electric power, and configured to engage the at least one electrical contact if the cover is in the closed position. The at least one electrical connector may be spring-loaded. The frame may comprise: a first rail configured to be located along the first side of the truck bed on a driver side of a truck; and a second rail configured to be located along the second side of the truck bed on a passenger side of the truck. The cover may comprise any other feature described herein.

A cover, such as the cover 801 and/or any other cover described herein (e.g., a truck bed cover), may comprise one or more of the following features. The cover may comprise a frame configured to be mounted to a truck bed. The frame may comprise: a first rail configured to be located along the truck bed on a driver side of a truck; and a second rail configured to be located along the truck bed on a passenger side of the truck. The frame may comprise a plurality of cover portions each comprising a first end and a second end, wherein the first end of each cover portion may be configured to rest on a portion of the frame configured to be located along a first side of the truck bed, and the second end of each cover portion may be configured to rest on a portion of the frame configured to be located along a second side of the truck bed. The cover may comprise one or more lighting elements. The cover may comprise an electronic control system. The electronic control system may be configured to illuminate the one or more lighting elements. The cover may comprise at least one power cable configured to be fixedly attached to the frame and to be electrically coupled to a power supply of the truck. The cover may comprise at least one electrical connector that may be configured to be fixedly attached to at least one of the plurality of cover portions and electrically coupled to the one or more lighting elements and that may be configured to be: electrically coupled to the power supply of the truck via the at least one power cable if the truck bed cover is in a closed position; and electrically decoupled from the power supply of the truck if the truck bed cover is in an open position. The plurality of cover portions may comprise a first cover portion, a second panel portion, and a third cover portion in a tri-fold configuration. The second cover portion may comprise: at least one first hinge element coupling the second cover portion to the first cover portion in a manner that enables the first cover portion to be rotatably stacked on top of a first surface of the second cover portion in a substantially flat position. The cover may comprise at least one second hinge element coupling the second cover portion to the third cover portion in a manner that enables a second surface of the second cover portion to be rotatably stacked on top of the third cover portion in a substantially flat position. The truck bed cover may be a roll up cover. The plurality of cover portions may comprise portions of the cover that may be configured to be rolled up and unrolled. The plurality of cover portions may be configured to be arrangeable in at least two positions comprising: a stored position in which the cover is rolled up; and an extended position in which the cover is substantially flat along the frame. The at least one power cable may be configured to be coupled to the power supply based on at least one light operation of the truck. The electronic control system may be configured to: illuminate the one or more lighting elements if the truck bed cover is in the closed position and if the at least one light operation of the truck is engaged. The at least one light operation may comprise one or more of: a brake light operation; a running light operation; a turn signal light operation; a reverse light operation; and/or an animation light operation. The frame may comprise: a first rail that may be configured to be located along the first side of the truck bed on a driver side of a truck; and a second rail that may be configured to be located along the second side of the truck bed on a passenger side of the truck. The electronic control system may comprise at least one energy storage device electrically that may be coupled to the one or more lighting elements and that may be configured to provide power for illumination of the one or more lighting elements for a time duration after the at least one electrical contact is electrically decoupled from the power supply. The at least one energy storage device may comprise at least one of: a battery; or a capacitor. The one or more lighting elements may be configured to be electrically coupled to the power supply via the at least one power cable and via an intermediate contact if the truck bed cover is in an intermediate position, between the open position and the closed position. The one or more lighting elements may be configured to be illuminated if the truck bed cover is in the intermediate position. The cover may comprise at least one electrical contact fixedly attached to the frame, electrically coupled to the power supply, and configured to engage the at least one electrical connector if the truck bed cover is in the closed position. The at least one electrical connector may be spring-loaded. The cover may comprise any other feature described herein.

An apparatus, such as the cover 801 and/or any other cover described herein (e.g., a truck bed cover), may comprise one or more of the following features. While the apparatus may include a frame, in at least some examples the apparatus does not include a frame. The apparatus may comprise a cover (and/or an outer shell of a cover). The cover may comprise a first end and a second end. The first end of the cover may be configured to rest on a first side of a truck bed (e.g., a driver side of the truck bed). The second end of the cover may be configured to rest on a second side of the truck bed (e.g., a passenger side of the truck bed). The cover may be configured to be arrangeable in at least two positions comprising: a stored position in which the cover is either rolled up or stacked; and an extended position in which the cover is substantially flat. The apparatus may comprise one or more lighting elements coupled to the cover. The apparatus may comprise at least one mounting structure that may be configured to be fixedly attached to at least one of: the first side of the truck bed, or the second side of the truck bed. The apparatus may comprise at least one power cable that may be configured to be fixedly attached to the at least one mounting structure and electrically coupled to a power supply. The apparatus may comprise at least one electrical connector that may be configured to be fixedly attached to the cover and electrically coupled to the one or more lighting elements, and that may be configured to be: electrically coupled to the power supply via the at least one power cable if the cover is in the extended position; and electrically decoupled from the power supply if the cover is in the stored position. The at least one power cable may be configured to be electrically coupled to the power supply based on at least one light operation of a vehicle. The apparatus may further comprise an electronic control system configured to: illuminate the one or more lighting elements if the cover is in the extended position and if the at least one light operation of the vehicle is engaged. The at least one light operation may comprise one or more of: a brake light operation; a running light operation; a turn signal light operation; a reverse light operation; and/or an animation light operation. The apparatus may comprise at least one energy storage device that may be electrically coupled to the one or more lighting elements and that may be configured to provide power for illumination of the one or more lighting elements for a time duration after the at least one electrical contact is electrically decoupled from the power supply. The at least one energy storage device may comprise at least one of: a battery; or a capacitor. The one or more lighting elements may be configured to be electrically coupled to the power supply via the at least one power cable and via an intermediate contact if the cover is in an intermediate position, between the stored position and the extended position. The one or more lighting elements may be configured to be illuminated if the cover is in the intermediate position. The apparatus may further comprise at least one electrical contact fixedly attached to the at least one mounting structure, electrically coupled to the power supply, and configured to engage the at least one electrical connector if the cover is in the extended position. The at least one electrical connector may be spring-loaded. The one or more lighting elements may be coupled to the cover at an edge of the cover. The edge of the cover may be configured to be located at an edge of the apparatus when the cover is in the extended position.

It is noted that various connections between elements are discussed in the following description. It is noted that these connections are general and, unless specified otherwise, may be direct or indirect, wired or wireless, and that the specification is not intended to be limiting in this respect. The examples and arrangements described are merely some example arrangements in which the systems described herein may be used. Various other arrangements employing aspects described herein may be used without departing from the invention.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, and/or an embodiment combining software, hardware, and firmware aspects in any combination. Various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may comprise one or more non-transitory computer-readable media.

Aspects of the disclosure have been described in terms of example embodiments. Other embodiments, modifications, and/or variations within the scope and spirit of the appended claims will be evident to persons of ordinary skill in the art. For example, one or more of the steps depicted in the example figures may be performed in a different order, one or more steps described with respect to one figure may be used in combination with one or more steps described with respect to another figure, and/or one or more described steps may be optional.

The invention claimed is:

1. A truck bed cover comprising:
a frame configured to be mounted to a truck bed;
a plurality of slats each comprising a first end and a second end, wherein the first end of each slat is configured to moveably rest on a first side of the truck bed, and the second end of each slat is configured to moveably rest on a second side of the truck bed, to facilitate movement of the plurality of slats relative to the frame;
one or more lighting elements; and
an electronic control system configured to move the plurality of slats and configured to illuminate the one or more lighting elements, wherein the electronic control system comprises:
at least one power cable configured to be fixedly attached to the frame and electrically coupled to electric power; and
at least one electrical contact that is electrically coupled to the one or more lighting elements and that is configured to be:
electrically coupled to the electric power, via at least one electrical connector coupled to the at least one power cable, if the truck bed cover is in a closed position; and
electrically decoupled from the electric power, by being disconnected from the at least one electrical connector coupled to the at least one power cable, if the truck bed cover is in an open position.

2. The truck bed cover of claim 1, wherein the at least one power cable is configured to be coupled to the electric power based on at least one light operation of a truck, and wherein the electronic control system is further configured to:
illuminate the one or more lighting elements if the truck bed cover is in the closed position and if the at least one light operation of the truck is engaged, wherein the at least one light operation comprises one or more of:
a brake light operation;
a running light operation;
a turn signal light operation;
a reverse light operation; or
an animation light operation.

3. The truck bed cover of claim 1, wherein the plurality of slats comprises an end slat, and wherein the end slat comprises the one or more lighting elements.

4. The truck bed cover of claim 1, wherein the electronic control system further comprises:
at least one motor configured to receive the electric power to control movement of the plurality of slats along the first side of the truck bed and along the second side of the truck bed; and
a receiver configured to receive a command to control the at least one motor, wherein the command corresponds to:
a command to open the truck bed cover via rotation of at least one shaft of the at least one motor in a first direction; or
a command to close the truck bed cover via rotation of the at least one shaft of the at least one motor in a second direction that is an opposite rotation relative to the first direction.

5. The truck bed cover of claim 1, wherein the electronic control system further comprises at least one energy storage device electrically coupled to the one or more lighting elements and configured to provide power for illumination of the one or more lighting elements for a time duration after the at least one electrical contact is electrically decoupled from the electric power, wherein the at least one energy storage device comprises at least one of:

a battery; or a capacitor.

6. The truck bed cover of claim 1, wherein the one or more lighting elements is configured to be electrically coupled to the electric power via the at least one power cable and via an intermediate connector if the truck bed cover is in an intermediate position, between the open position and the closed position, and wherein the one or more lighting elements is configured to be illuminated if the truck bed cover is in the intermediate position.

7. The truck bed cover of claim 1, further comprising the at least one electrical connector, wherein the at least one electrical connector is fixedly attached to the frame, electrically coupled to the electric power, and configured to engage the at least one electrical contact if the truck bed cover is in the closed position.

8. The truck bed cover of claim 1, wherein the frame comprises:

a first rail configured to be located along the first side of the truck bed on a driver side of a truck; and a second rail configured to be located along the second side of the truck bed on a passenger side of the truck.

9. A truck bed cover comprising:

a frame configured to be mounted to a truck bed;

a plurality of cover portions each comprising a first end and a second end, wherein the first end of each cover portion is configured to rest on a portion of the frame configured to be located along a first side of the truck bed, and the second end of each cover portion is configured to rest on a portion of the frame configured to be located along a second side of the truck bed;

one or more lighting elements; and an electronic control system comprising:

at least one power cable configured to be fixedly attached to the frame and to be electrically coupled to a power supply of a truck; and at least one electrical connector that is configured to be fixedly attached to at least one of the plurality of cover portions and electrically coupled to the one or more lighting elements, and that is configured to be:

electrically coupled to the power supply of the truck, via at least one electrical contact coupled to the at least one power cable, if the truck bed cover is in a closed position; and electrically decoupled from the power supply of the truck, by being disconnected from the at least one electrical contact coupled to the at least one power cable, if the truck bed cover is in an open position.

10. The truck bed cover of claim 9, wherein the plurality of cover portions comprises a first cover portion, a second cover portion, and a third cover portion in a tri-fold configuration, whereby the second cover portion comprises:

at least one first hinge element coupling the second cover portion to the first cover portion in a manner that enables the first cover portion to be rotatably stacked on top of a first surface of the second cover portion in a substantially flat position; and at least one second hinge element coupling the second cover portion to the third cover portion in a manner that enables a second surface of the second cover portion to be rotatably stacked on top of the third cover portion in a substantially flat position.

11. The truck bed cover of claim 9, wherein truck bed cover is a roll up cover, the plurality of cover portions comprises portions of the cover that are configured to be rolled up and unrolled, and the plurality of cover portions are configured to be arrangeable in at least two positions comprising:

a stored position in which the cover is rolled up; and an extended position in which the cover is substantially flat along the frame.

12. The truck bed cover of claim 9, wherein the at least one power cable is configured to be coupled to the power supply based on at least one light operation of the truck, and wherein the electronic control system is configured to:

illuminate the one or more lighting elements if the truck bed cover is in the closed position and if the at least one light operation of the truck is engaged, wherein the at least one light operation comprises one or more of:

a brake light operation;

a running light operation;

a turn signal light operation;

a reverse light operation; or an animation light operation.

13. The truck bed cover of claim 9, wherein the frame comprises:

a first rail configured to be located along the first side of the truck bed on a driver side of a truck; and a second rail configured to be located along the second side of the truck bed on a passenger side of the truck.

14. The truck bed cover of claim 9, wherein the one or more lighting elements is configured to be electrically coupled to the power supply via the at least one power cable and via an intermediate contact if the truck bed cover is in an intermediate position, between the open position and the closed position, and wherein the one or more lighting elements is configured to be illuminated if the truck bed cover is in the intermediate position.

15. The truck bed cover of claim 9, further comprising the at least one electrical contact, wherein the at least one electrical contact is fixedly attached to the frame, electrically coupled to the power supply, and configured to engage the at least one electrical connector if the truck bed cover is in the closed position.

16. An apparatus comprising:

a cover comprising a first end and a second end, wherein the first end of the cover is configured to rest on a first side of a truck bed and the second end of the cover is configured to rest on a second side of the truck bed, and wherein the cover is configured to be arrangeable in at least two positions comprising:

a stored position in which the cover is either rolled up or stacked; and an extended position in which the cover is substantially flat;

one or more lighting elements coupled to the cover;

at least one mounting structure configured to be fixedly attached to at least one of: the first side of the truck bed, or the second side of the truck bed;

at least one power cable that is configured to be fixedly attached to the at least one mounting structure and electrically coupled to a power supply; and at least one electrical connector that is configured to be fixedly attached to the cover and electrically coupled to the one or more lighting elements, and that is configured to be:

electrically coupled to the power supply, via at least one electrical contact coupled to the at least one power cable, if the cover is in the extended position; and electrically decoupled from the power supply, by being disconnected from the at least one electrical contact coupled to the at least one power cable, if the cover is in the stored position.

17. The apparatus of claim 16, wherein the at least one power cable is configured to be electrically coupled to the power supply based on at least one light operation of a vehicle, and wherein the apparatus further comprises an electronic control system configured to:

illuminate the one or more lighting elements if the cover is in the extended position and if the at least one light operation of the vehicle is engaged, wherein the at least one light operation comprises one or more of:

a brake light operation;

a running light operation;

a turn signal light operation;

a reverse light operation; or an animation light operation.

18. The apparatus of claim 16, wherein the one or more lighting elements is configured to be electrically coupled to the power supply via the at least one power cable and via an intermediate contact if the cover is in an intermediate position, between the stored position and the extended position, and wherein the one or more lighting elements is configured to be illuminated if the cover is in the intermediate position.

19. The apparatus of claim 16, further comprising the at least one electrical contact, wherein the at least one electrical contact is fixedly attached to the at least one mounting structure, electrically coupled to the power supply, and configured to engage the at least one electrical connector if the cover is in the extended position.

20. The apparatus of claim 16, wherein the one or more lighting elements are coupled to the cover at an edge of the cover, and wherein the edge of the cover is configured to be located at an edge of the apparatus when the cover is in the extended position.

*   *   *   *   *